(12) United States Patent
Freeman et al.

(10) Patent No.: US 7,337,452 B2
(45) Date of Patent: Feb. 26, 2008

(54) TILT FOCUS MECHANISM FOR AN OPTICAL DRIVE

(75) Inventors: Robert David Freeman, Erie, CO (US); Thomas Edward Berg, Fort Collins, CO (US); David William Niss, Boulder, CO (US); Peter Jeffrey Raymond, Erie, CO (US)

(73) Assignee: DPHI Acquisitions, Inc., Longmont, CO (US)

( * ) Notice: Subject to any disclaimer, the term of this patent is extended or adjusted under 35 U.S.C. 154(b) by 1 day.

(21) Appl. No.: 09/815,377

(22) Filed: Mar. 21, 2001

(65) Prior Publication Data

US 2002/0101796 A1 Aug. 1, 2002

Related U.S. Application Data

(63) Continuation-in-part of application No. 09/557,284, filed on Apr. 24, 2000, now Pat. No. 6,901,598.

(51) Int. Cl.
*G11B 7/09* (2006.01)

(52) U.S. Cl. .................................................. 720/662

(58) Field of Classification Search ............ 360/244.3, 360/244, 244.2, 244.4, 294.7; 369/244, 176, 369/251; 720/658, 659, 662, 663, 672
See application file for complete search history.

(56) References Cited

U.S. PATENT DOCUMENTS 3,918,722 A * 11/1975 Nakajima et al. ........... 369/247

| 5,521,778 | A | * | 5/1996 | Boutaghou et al. ...... 360/264.5 |
| 5,771,135 | A | * | 6/1998 | Ruiz et al. ................ 360/244.3 |
| 6,052,357 | A | | 4/2000 | Ogawa et al. .............. 369/215 |
| 6,091,578 | A | * | 7/2000 | Stole et al. ............... 360/265.9 |
| 6,236,634 | B1 | * | 5/2001 | Lee et al. ............... 369/112.23 |
| 6,449,225 | B1 | * | 9/2002 | Alon ....................... 369/44.17 |

FOREIGN PATENT DOCUMENTS

| EP | 0 400 570 A2 | | 5/2000 |
| JP | 60-121544 A | * | 6/1985 |
| JP | 61-264524 A | * | 11/1986 |
| JP | 62-34338 A | * | 2/1987 |
| JP | 63-113945 A | * | 5/1988 |

OTHER PUBLICATIONS

Pohlmann, K.C., The compact disc: a handbook of theory and use (Madison, WI: A-R Editions, 1989) pp. 90-91, 144-145.*
Patent Abstracts of Japan, vol. 009, No. 276, Nov. 2, 1985.
Patent Abstracts of Japan, vol. 011, No. 118, Apr. 14, 1987.
Patent Abstracts of Japan, vol. 011, No. 216, Jul. 14, 1987.
Patent Abstracts of Japan, vol. 012, No. 363, Sep. 29, 1988.

* cited by examiner

*Primary Examiner*—Julie Anne Watko
(74) *Attorney, Agent, or Firm*—Jonathan W. Hallman; MacPherson Kwok Chen & Held LLP

(57) ABSTRACT

An apparatus for dynamically positioning a rotary actuator that positions an objective lens in three dimensions relative to the surface of an optical disk. A first voice coil motor positions the actuator generally in two dimensions parallel to the surface of the disk and a second voice coil motor positions the objective lens generally along an arcuate path orthogonal to the surface of the disk.

1 Claim, 49 Drawing Sheets

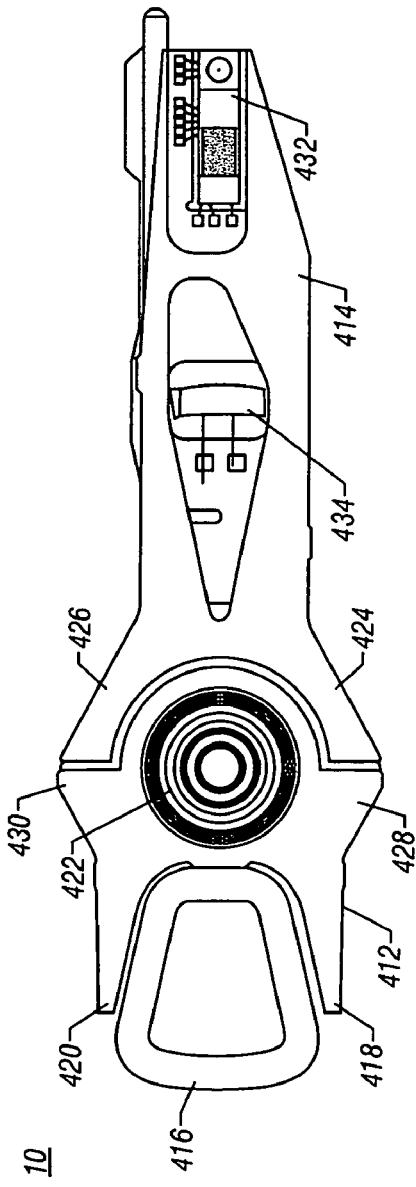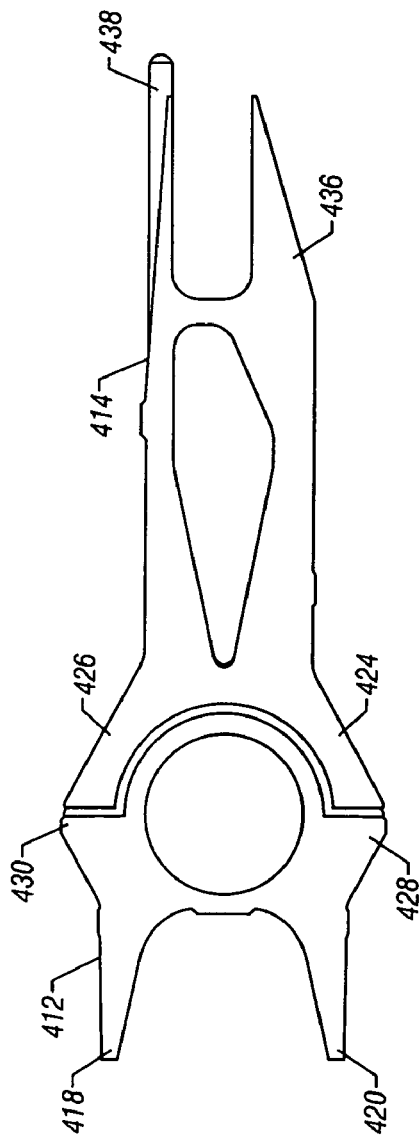
FIG. 36
FIG. 37

TILT FOCUS MECHANISM FOR AN OPTICAL DRIVE

CROSS-RELATED TO RELATED APPLICATIONS

The present application is a continuation in part of U.S. patent application Ser. No. 09/557,284, filed Apr. 24, 2000, now U.S. Pat. No. 6,901,598 entitled "Tilt Focus Method and Mechanism For an Optical Drive," which is related to U.S. patent application Ser. No. 09/315,398, filed May 20, 1999 now abandoned, entitled "Removable Optical Storage Device and System," now abandoned, U.S. Provisional application Ser. No. 60/140,633, filed Jun. 23,1999, entitled "Combination Mastered and Writeable Medium and Use in Electronic Book Internet Appliance," U.S. patent application Ser. No. 09/393,899, filed Sep. 10, 1999, entitled "Content Distribution Method and Apparatus," U.S. patent application Ser. No. 09/393,150, filed. Sep. 10, 1999, entitled "Writeable Medium Access Control Using a Medium Writeable Area," now U.S. Patent No. 6,631,359, U.S. patent application Ser. No. 09/548,128, filed Apr. 12, 2000, entitled "Low Profile and Medium Protecting Cartridge Assembly," U.S. patent application Ser. No. 09/560,781, entitled "Miniature Optical Disk for Data Storage," now abandoned, U.S. patent application Ser. No. 09/540,657, filed Mar. 31,2000, entitled "Low Profile Optical Head," U.S. application Ser. No. 09/457,104, filed Dec. 7, 1999, entitled "Low Profile Optical Head," and U.S. application Ser. No. 09/815,293, filed Mar. 21, 2001, entitled "Disk Drive Actuator and Method of Making Same" U.S. Patent No. 6,632,310, all of which are incorporated herein by reference in their entireties.

FIELD OF THE INVENTION

The present invention is directed generally to an optical disk drive and more specifically to a method and mechanism for positioning an optical pickup element in three dimensions relative to an optical disk. The invention may utilize single or multiple optical disks. In the case of a single disk, the disk may be removable or non-removable.

BACKGROUND OF THE INVENTION

Optical disk drives are ideally suited for use in personal electronic devices (PEDs). By way of example, optical disk drives may be advantageously utilized in PEDs such as digital cameras, music reproduction equipment, MP3 players, cellular telephones, dictating equipment and personal digital assistants such as microcomputers. In particular, as compared to magnetic disk drives, optical disk drives are superior in terms of storage capacity, power consumption and data transfer speed. As a result, they can be smaller in size and cost. To be practical in PEDs, however, the optical drives need to be substantially pocket sized (e.g., no more than about 100 mm in the in the largest dimension, but preferably no more than about 50 mm, and preferably having at least one cross section no more than about 100 mm by about 50 mm, preferably no more than about 75 mm by about 25 mm) and have a mass of no greater than about ⅓ kg.

Much of the development of optical disk data storage has centered around apparatus in which the read/write mechanism was configured to position a read/write beam at a desired radial location on the disk in a substantially linear fashion (i.e., linear actuators). Typically, a sled carrying an objective lens moves radially along a pair of rails between the inside and outside diameter of a disk for course tracking purposes. A second mechanism or linkage is mounted in the sled and rotates the objective lens in an arcuate path for fine tracking purposes. Further structure also moves the objective lens orthogonally relative to the disk surface for purposes of adjusting the focus of the light beam on the data layer of the disk. While linear actuators have proved useful in a number of contexts, such as for reading/writing CDs and DVDs, the location and mass of the components in linear actuators has typically affected performance parameters such as access time, data transfer rates, and the like. In addition, linear actuators are relatively high-friction devices and require precise track alignment. Linear actuators typically add substantial thickness to a read/write or drive device and generally do not scale well toward miniaturization. Also, linear actuators are typically unbalanced systems in that the mass of the components, including the objective lens, is not evenly distributed relative to any pivot point. As a result, such actuators are highly susceptible to shock and vibration. Thus, linear actuators have, in general, found greatest use in applications where thickness, access time, bandwidth and power consumption are of less importance, and typically are used in larger stationary devices where space for moving the read/write head is available and the risk of shock or significant vibration is minimized.

Another factor affecting the size of an optical system is the size and shape of the light beam as it reaches the optical disk (the spot size and quality). Spot size and quality is, in turn, affected by a number of factors including, the size of the optical components, relative movement among the optical components, the distance the light beam must travel and the format of the optical disk. Although a wide variety of systems have been used or proposed, typical previous systems have used optical components (such as a laser source, lenses and/or turning mirrors) that were sufficiently large and/or massive that functions such as focus and/or tracking were performed by moving only some components of the system, such as moving the objective lens (e.g. for focus) relative to a fixed light source. However, relative movement between optical components, while perhaps useful for accommodating relatively large or massive components, presents certain disadvantages, including a relatively large form factor and the engineering and manufacturing associated with establishing and maintaining optical alignment between moveable components. Such alignment often involves manual and/or individual alignment or adjustment procedures which can undesirably increase manufacturing or fabrication costs for a reader/writer, as well as contributing to costs of design, maintenance, repair and the like. Accordingly, it would be useful to provide an optical head method, system and apparatus which can reduce or eliminate the need for relative movement between optical components during normal operation and/or can reduce or eliminate at least some alignment procedures, e.g., during reader/writer manufacturing.

In order to adequately miniaturize the mechanics associated with an optical disk drive for use in a commercially acceptable PEDs, the optical recording system's focus of the laser spot on the recording and playback surface must be maintained to assure acceptable recording and playback data integrity. In general terms, an objective lens directs a light beam to the optical disk and focuses the light beam into a conical shape with the apex or focal spot occurring at the data layer within the optical disk. Ideally, the conical beam is perpendicular to the surface of the disk, although, given irregularities in the manufacture of the disk and its component layers (i.e. disk flatness), bearing defect frequencies, and tolerances in the manufacture and assembly of the mechanical components, as well as shock and vibrations imparted into the disk drive during operation, perpendicularity between the disk surface and light beam is difficult to maintain. The distance between the objective lens and the data layer determines the particular characteristics which the objective lens must possess. For example, the farther the data layer of the disk is from the objective lens, the larger the objective lens must be in order to focus the light beam into the proper conical shape with the focal spot at or proximate to the data layer. In turn, as the objective lens increases in size in order to form the appropriately sized light beam, the other optical components must also increase in size in order to complement each other. Thus, for miniaturization purposes, it is critical to minimize this distance between the objective lens and the data layer on the disk.

A significant factor in reducing the distance between the objective lens and the data layer of the optical disk is the characteristics of the disk itself. Optical disks used in consumer products today typically utilize second surface optical media as opposed to first surface optical media. In the preferred embodiment of the present invention, the optical medium is first-surface media. Although it may be subject to more than one definition, first surface optical media refers to media in which the read beam during a read operation is incident on or impinges on information content portions of the first-surface optical media before it impinges on a substrate of the first-surface optical media. The information content portions can be defined as portions of the optical media that store or contain servo data, address data, clock data, user data, system data, as well as any other information that is provided on the optical media. The information content portions can be integral with the substrate such as the case of a read-only media. The information content portions can also be separately provided. In such a case, the information content portions can be, for example, an information layer of a writeable media. Stated conversely, second-surface media can refer to media in which the read beam is incident on the surface of the media or disk before it is incident on the information content portions.

A relatively thick and transparent outer layer or substrate of second-surface optical medium makes read-only or read-write operations relatively insensitive to dust particles, scratches and the like which are located more than 50 wavelengths from the information content portions. Considering the cone angle of the light beam after the light beam passes through the objective lens, there is also little detrimental change to the shape or power of the light spot by the time it reaches the information layer of this second-surface optical medium. On the other hand, the second-surface optical medium can be relatively sensitive to various optical aberrations. These optical aberrations include: (1) spherical aberrations—a phase error causing rays at different radii from the optic axis to be focused at different points; (2) coma—creating a "tail" on the recorded spot when the transparent layer is not perpendicular to the optical axis; (3) astigmatism—creating foci along two perpendicular lines, rather than a symmetric spot; and/or (4) birefringence—different polarizations of light behave differently because the read-only or read-write beam must propagate through a relatively longer distance before reaching the information layer, when an aberration is created at the air/transparent layer interface. This longer distance is attributable to the thickness of the relatively thick transparent substrate or layer. Compounding the unwanted birefringence is the requirement that the read-write beam must also traverse the transparent layer again after reflection.

Some or all of the aberrations arising from the presence of the thick transparent layer can, at least theoretically, be partially compensated for by using a suitable focus mechanism. However, such a focus mechanism, including the optical elements thereof, tends to be large in size and, concomitantly, increases the cost of the system. Additionally, such a focus mechanism typically can only provide compensation for a single, pre-defined thickness of the layer. Because there are likely be to spatial variations in the thickness or other properties of the transparent layer, such compensation may be less than desired at some locations of the medium.

Another drawback associated with second-surface optical media is that the optical requirements of such media are substantially inconsistent with the miniaturization of the disk drive and optical components for such media. As will be appreciated by reference to FIG. 1A, a longer focal length "f" is required for an optical system that will read information from or write information onto second-surface media. This is due to the relatively thick transparent layer "T" through which the radiation must pass to access the recording or data layer "D." To provide the longer focal length a larger beam cone is required which, in turn, requires larger optical components (e.g., objective lens "O"). Moreover, the relatively long optical path through the thick transparent layer to the data layer and back through the transparent layer after reflection significantly decreases laserpower efficiency in comparison to a medium without the transparent layer. In comparison, as shown in FIG. 1B, a shorter focal length "f" can be achieved by utilizing first surface recording instead of second surface recording. Importantly, a smaller focal distance "f" allows use of a smaller objective lens "O." This in turn allows the other optical components to be reduced in size thereby facilitating overall miniaturization.

To date, rotary actuators have not provided a solution to miniaturization in optical disk drives either. Like linear actuator systems, rotary actuator systems are subject to the same problems created by imperfections in the manufacture of disks, mechanical tolerances in the manufacture and assembly of the actuator arm and spindle, bearing defect frequencies, shock and vibration, among others. As a result, the data surface may be out of focus at any point in time, creating errors in reading from or writing to the disk. As stated earlier, optical drives have attempted to address this problem by moving the objective lens orthogonal to the ideal or presumed plane of the disk surface to change its focal length, and thereby attempt to maintain focus. This methodology has limited effectiveness. For example, in larger disks, such as DVDs and CDs, errors or fluctuations are compounded as the objective lens moves toward the outer diameter of the disk. Thus, in order to try to maintain focus, the objective lens is required to move a greater distance away from or toward the disk surface (in the Z direction). However, the necessary range of movement in a miniaturized system would likely be constrained by space limitations and/or physical limits purposefully placed in the drive to limit movement. In unbalanced systems in particular, such physical limits are required to prevent linkages from moving past their elastic limits, primarily due to external shock.

Another aspect of miniaturization of optical and magnetic disk drives is the constant increase in track density required to maintain desired storage capacity as the physical size of the mechanisms are reduced. The increase in track density places more stringent requirements on the servo-mechanical system's positioning accuracy. Additionally, in the case of the optical drive, the spot size of the light beam is reduced as track densities are increased (track widths are reduced).

This places more stringent demands on the servo-mechanical system's focus positioning accuracy. Given that the positioning motors for tracking and focusing are not co-located with the lens or magnetic recording head, the structural stiffness of the actuator arm members (which support the lens or magnetic recording head(s) at one end, and the tracking and/or focusing motors at some other location on the actuator arm) are crucial. The positioning information for the lens or magnetic recording head or heads, is sensed by the position of the recording and playback heads, while the motive force is applied at some other point on the actuator assembly or actuator arm. Deflections therefore cause errors in positioning of the recording and playback heads with respect to the desired position. The actuator arm members therefore must be optimized for stiffness to reduce the induced error. Mass properties of the arm must however, be optimized for low mass, in order for the servo positioning system and servo motors to be sufficiently responsive to follow position errors caused by imperfections in the manufacture of the disk, manufacture and assembly tolerances of component parts, bearing defects, spindle motor run out, shocks, vibrations and other conditions that cause misalignment of the light beam relative to data on the disk.

SUMMARY OF THE INVENTION

The focus mechanism of the present invention solves many of the miniaturization problems associated with previous optical disk drive systems. The present invention comprises a rotary actuator having a tracking arm for movement of an optical pick up unit generally parallel to the disk surface and a focus arm for movement generally perpendicular to the disk surface. The focus arm may be balanced or unbalanced, although a balanced system is preferred in order to best handle shock and vibration. The optical pick up unit is supported at the distal end of the focus arm. In the preferred embodiment, the optical pick up unit includes a light source, such as a laser, an objective lens for directing the light beam to the recording/playback surface of the disk and intermediate optical components such as turning mirrors and focusing lenses. The light beam is folded utilizing turning mirrors to achieve a length that is compatible with a chosen objective lens. The optical pickup unit achieves further miniaturization when used in combination with media utilizing first surface data, although it will also work with second surface media. In the context of first surface data, the objective lens can be smaller because the information containing portion or data layer is closer to the objective lens which allows use of a lens with a shorter focal length.

The tilt focus method of the present invention also introduces an out-of-perpendicular condition for the laser beam for purposes of maintaining the focus of the light beam on the data layer of the disk. Rotation of the focus arm relative to the tracking arm moves or pivots the focus arm which also moves the optical pick up unit, including the objective lens. In general terms, the optical pick up unit will move in an arcuate or curved path toward or away from the surface of the disk, although the directional component of movement orthogonal to the disk surface is substantially greater than the directional component of movement parallel to the disk surface. This is true for each of the embodiments described herein, except one, even though the magnitude of movement in each of the component directions may vary among embodiments. In the third principal embodiment described herein, the optical pick up unit does not move in an arcuate path. For purposes of this patent, however, the terms perpendicular or substantially perpendicular will be used to refer to movement of the optical pick up unit in each embodiment.

By dynamically adapting the position of the objective lens during operation of the drive, the system can respond to variations in the relative position of the data layer caused by imperfections in the manufacture of the disk, manufacture and assembly tolerances of component parts, bearing defects, spindle motor run out, shocks, vibrations and other conditions that cause misalignment of the light beam relative to data on the disk. In this manner, the present invention will overcome conditions that could otherwise result in read/write errors.

BRIEF DESCRIPTION OF THE DRAWINGS

FIG. 36 is a top plan view of an embodiment of the actuator assembly of the present invention.

FIG. 37 is a top plan view of an embodiment of the actuator assembly of the present invention, with the optical, magnetic and electrical components removed.

DETAILED DESCRIPTION OF THE PREFERRED EMBODIMENT

Figure 1A:
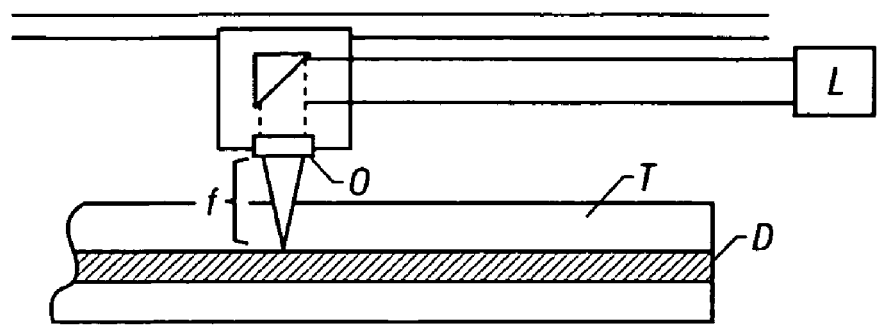
FIG. 1A is a cross-sectional schematic view of a linear actuator and light beam focused on a non-first surface data layer.
Figure 1B:
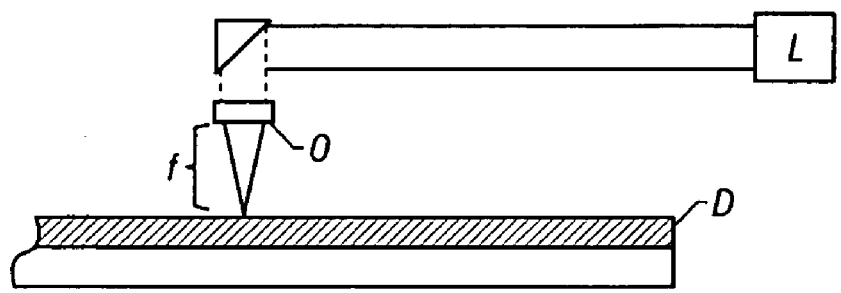
FIG. 1B is a cross-sectional schematic view of a linear actuator and light beam focused on a first surface data layer.
Figure 2:
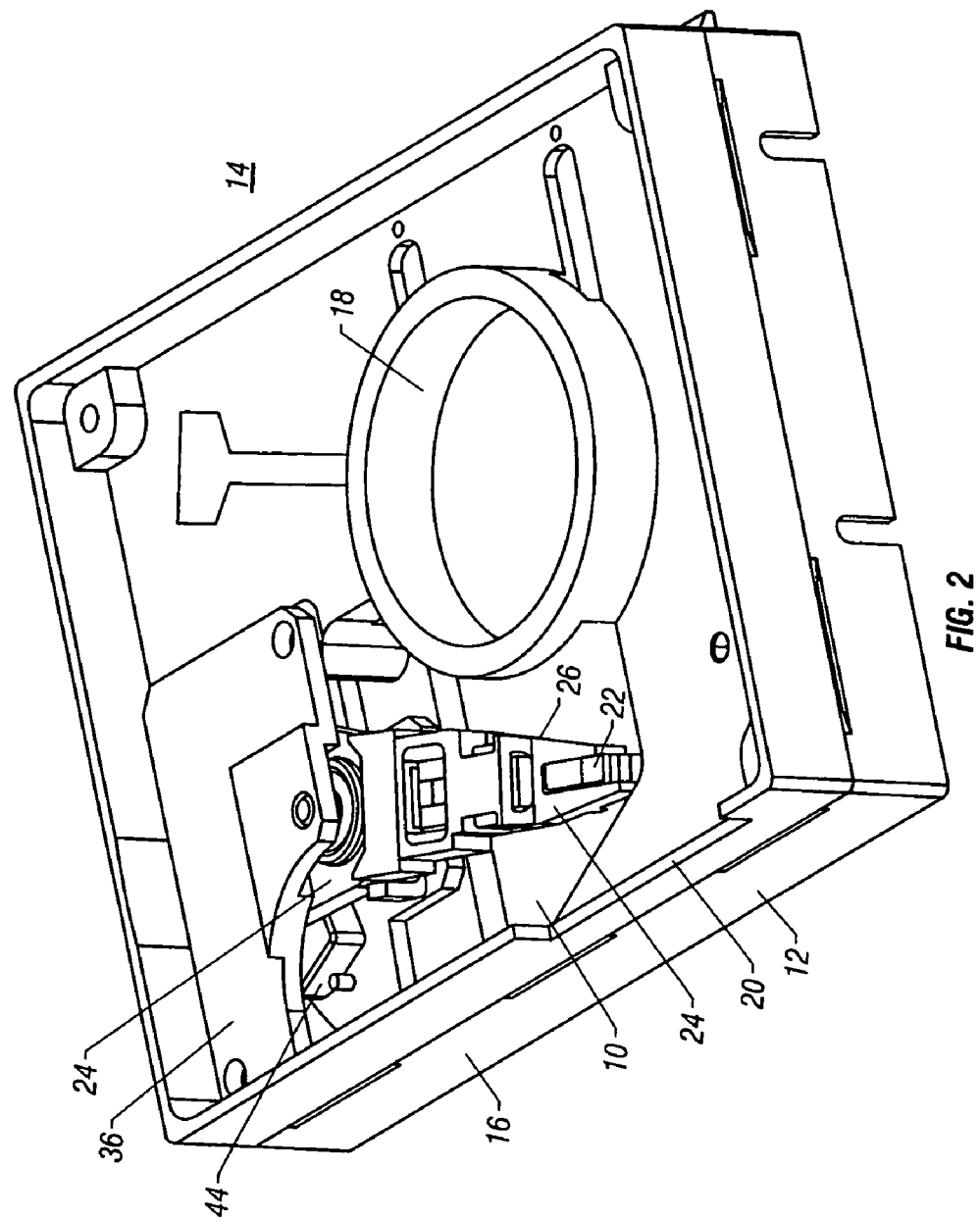
FIG. 2 is a three-quarter perspective view of an optical disk drive of the present invention.

Turning to FIG. 2, a first embodiment of the tilt focus mechanism 10 is shown within the housing 12 of an optical drive 14. The housing 12 includes a base plate 16 having an aperture 18 for receiving a spin motor (not shown) and a slot 20 to receive a diskette containing an optical disk (not shown). The cover plate has been removed. A diskette is inserted into the slot 20 and engages the spin motor positioned in aperture 18. An optical pick up unit 22 is positioned at the distal end of the tilt focus mechanism 10 and directs a light beam (not shown), such as a laser, to the optical disk which is spinning at a rapid rate.

The light beam may be used to write information to the disk or may be used to read information resident on the disk. Because information is stored on the disk in tracks, typically concentrically arranged, the optical pick up unit (OPU) 22 must be able to traverse the surface of the disk from the inside to the outside diameter in order to access the information formatted on the disk, whether in tracks or not. To accomplish this, the tilt focus mechanism 10 moves in three directions relative to the surface of the optical disk. Generally, the tilt focus mechanism 10 moves laterally across the disk surface for tracking purposes, which can be defined as the X-Y plane for convenience purposes, and it also moves toward and away from the disk surface for focusing purposes, which can be defined as the Z direction for convenience purposes. In this manner, as explained in greater detail below, the tilt focus mechanism 10 can compensate for imperfections in the optical media and read and write data to and from the optical disk more accurately and faster than existing optical drives or magnetic drives.

As shown in FIGS. 3-8, a first embodiment of the tilt focus mechanism 10 comprises a tracking arm 24 and a focus arm 26 disposed on the distal end of the tracking arm 24. Rotary motion is imparted to the tracking arm 24 by means of a voice coil motor (VCM) 28. More specifically, the tracking arm 24, shown separately in FIGS. 4 and 5, includes a central bearing mounting bore 30 which receives a bearing cartridge 32. The bearing cartridge 32 pivots about a fixed shaft 34 mounted between the tracing VCM return plate 36 and a voice coil motor magnet plate 38. The tracking arm 24 further includes a wire coil 40 wound around a bobbin 42 and adhered between a pair of rearwardly extending support arms 44, 46 of the tracking arm 24 with an adhesive 48. By directing a current through the wire coil 40 a magnetic field is created which interacts with the magnetic fields surrounding a pair of permanent tracking magnets 50, 52 (shown in FIGS. 2 and 4), forcing the tracking arm 24 to pivot about the shaft 34. It should be appreciated that the relative positions of the permanent tracking magnets 50, 52 and the wire coil 40 may be switched, with the coil 40 being stationary and the magnets 50, 52 affixed to and moving with the tracking arm 24.

The focus arm 26 is mounted to the distal end of the tracking arm 24. A counterweight 54 is typically affixed to the end of the tracking arm 24 for purposes of counter balancing about the shaft 34 the weight of the focus arm 26 components on the opposite end of the tracking arm 24. The OPU 22 is positioned on the distal end of the focus arm 26 between a pair of support arms 56, 58. The purpose of the focus arm 26 is to move the OPU 22 toward and away from the disk surface, in the Z direction. A focus bearing assembly 60, mounted in the tracking arm 24, cooperates with a shaft 62 to allow the focus arm 26 to rotate relative to the tracking arm 24 and the disk surface (i.e., in the Z direction). The shaft 62 mounts in a pair of focus bearings 64 which, in turn, are mounted in a pair of pivot bearing supports 66, 68 in the focus arm 26.

Figure 4:
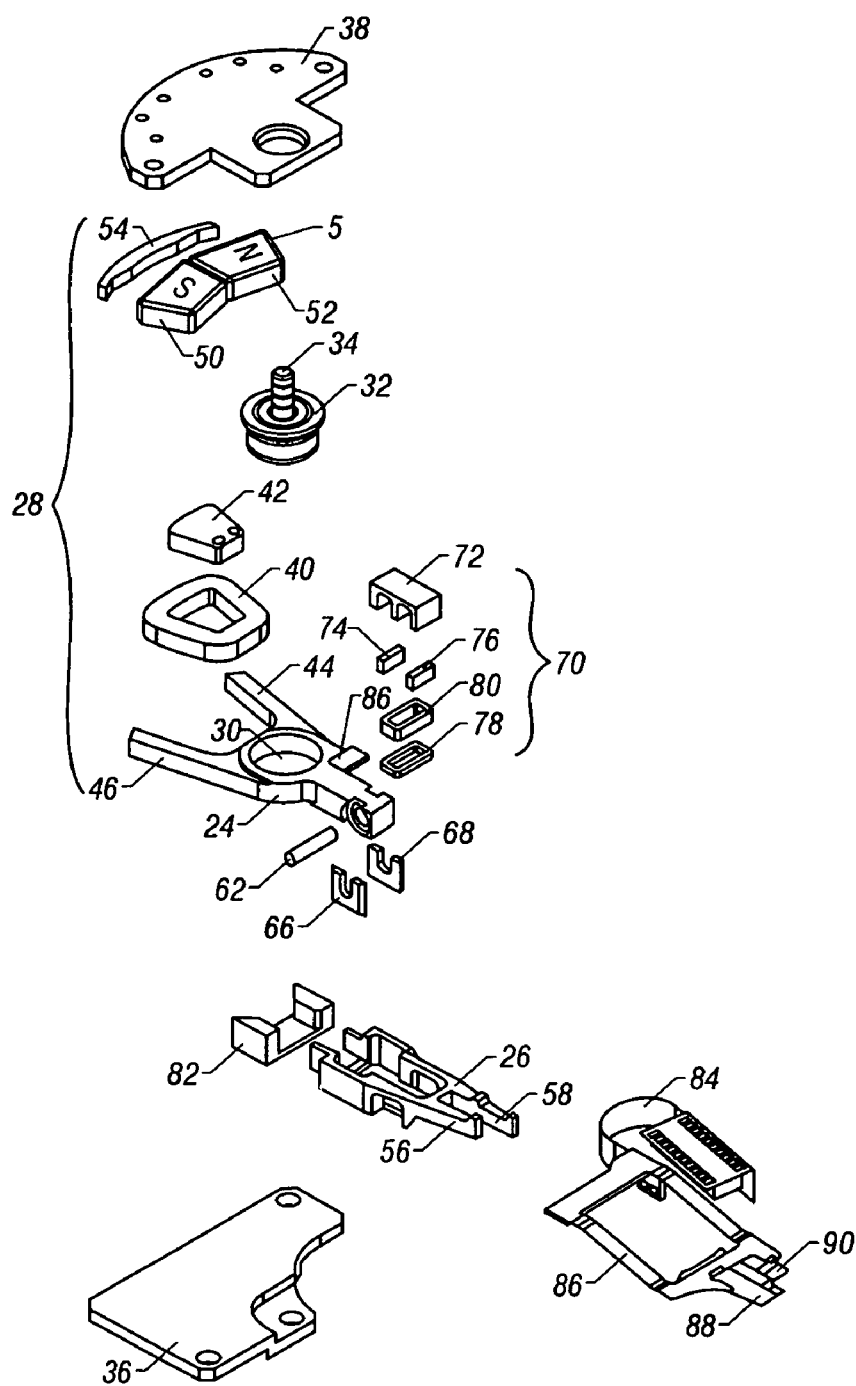
FIG. 4 is an exploded view of the component pieces of the tilt focus mechanism shown in FIG. 3.
Figure 5:
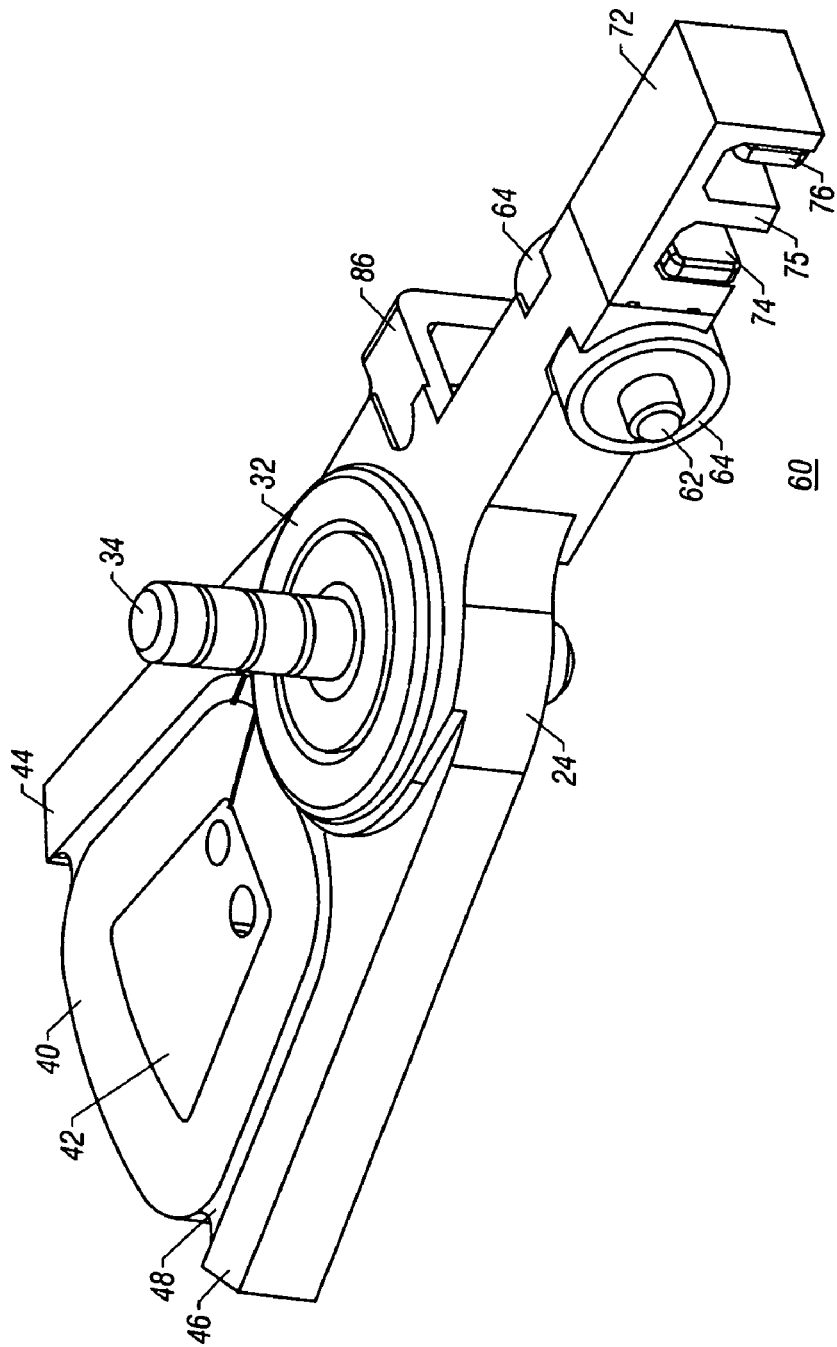
FIG. 5 is a three-quarter perspective view of the tracking arm of the tilt focus mechanism shown in FIG. 3.
Figure 6:
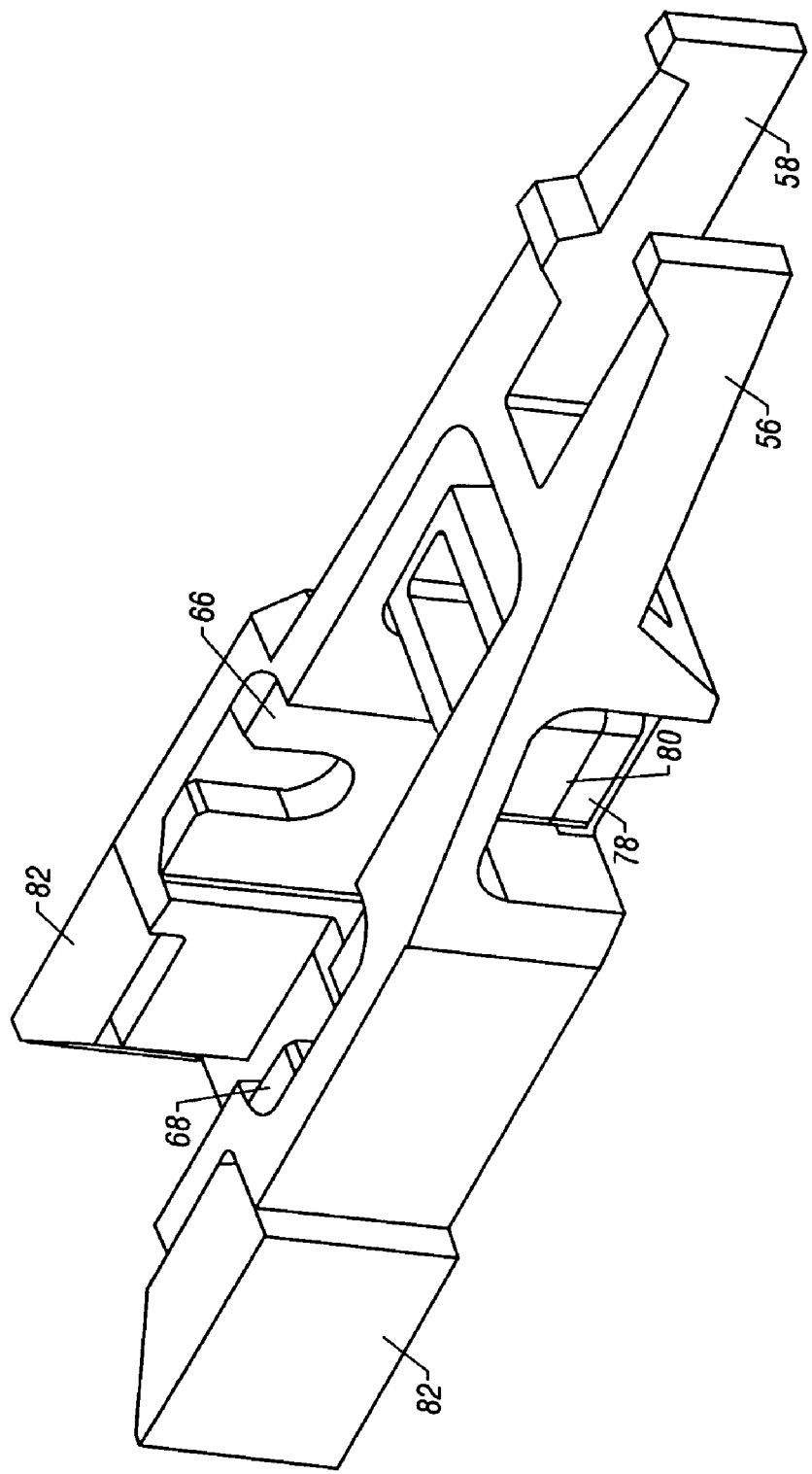
FIG. 6 is a three-quarter perspective view of the focus arm of the tilt focus mechanism shown in FIG. 3.
Figure 7:
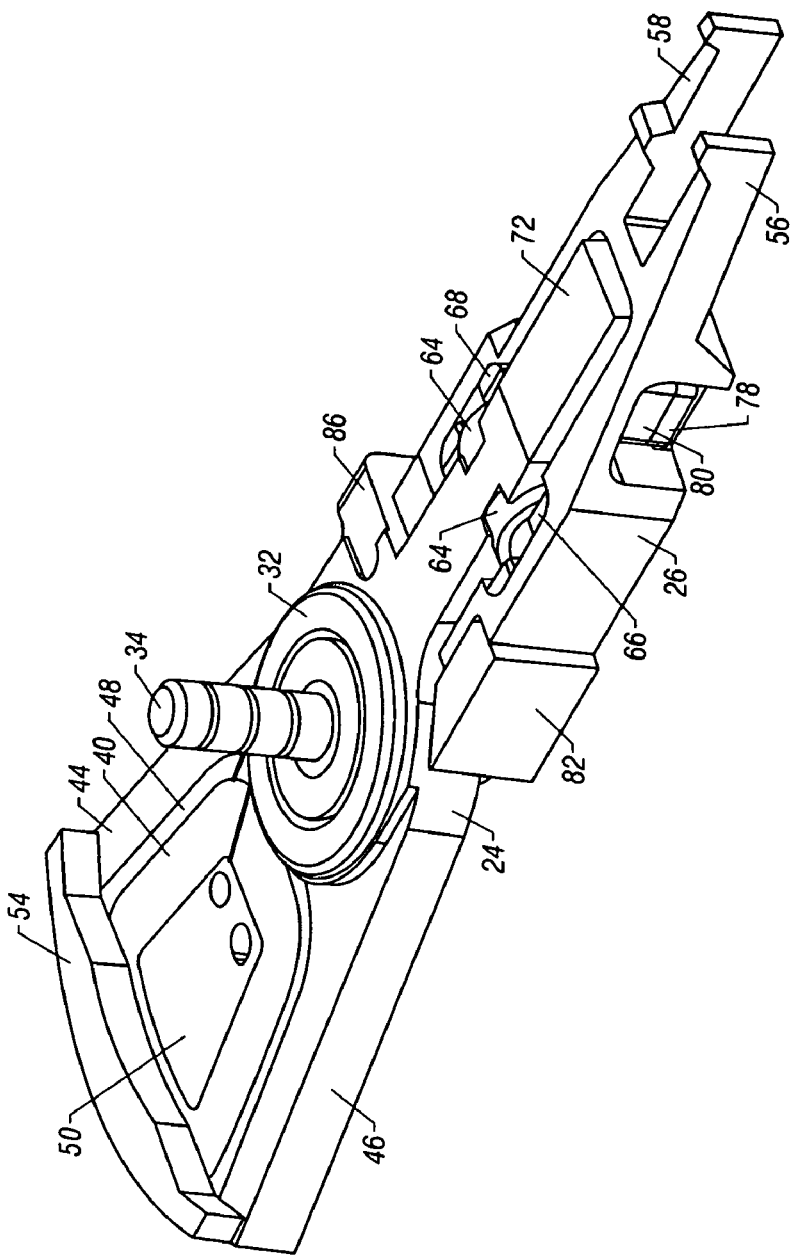
FIG. 7 is a three-quarter perspective view of the tracking arm and focus arm of the tilt focus mechanism shown in FIG. 3.
Figure 8:
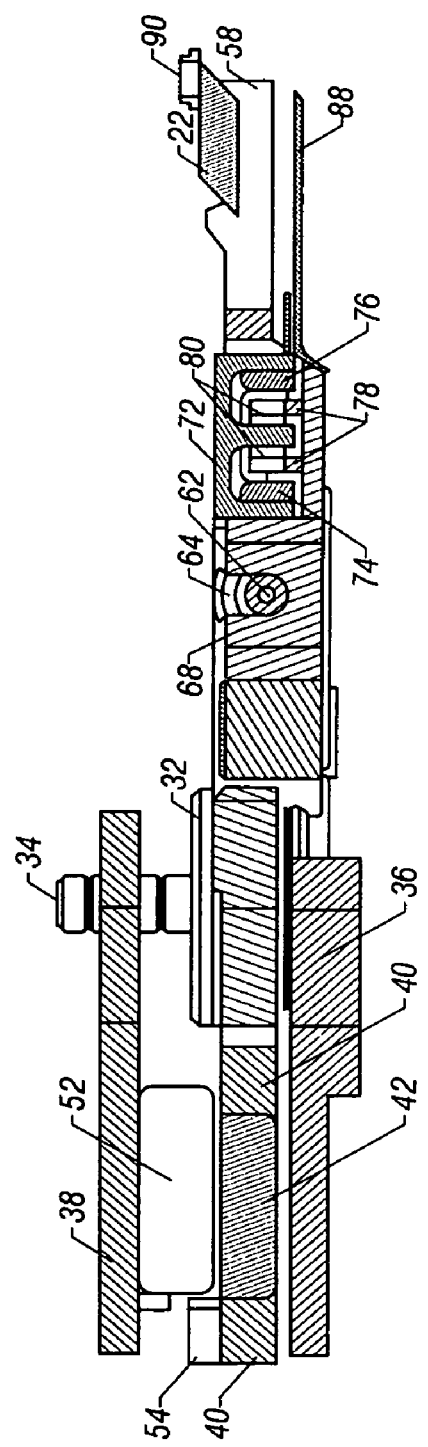
FIG. 8 is a cross-sectional view of the tilt focus mechanism shown in FIG. 3.

Movement of the focus arm 26 relative to the tracking arm 24 is created by a second voice coil motor (VCM) 70 (FIG. 4). As best seen in FIGS. 5-8, a voice coil motor frame 72 is disposed at the forward end of the tracking arm 24. A pair of permanent magnets 74, 76 are mounted to the VCM frame 72. A focus coil 78, attached to the focus arm 26, is positioned adjacent each of the permanent magnets 74, 76 with the center arm 75 of the VCM frame 72 positioned in the open center area of the focus coil 78. A spacer 80 may be included to optimize the position of the focus coil within the magnetic field created by the magnets 74, 76. By inducing a current in the focus coil 78, the focus arm 24 will pivot in the Z direction about the bearing assembly 60 relative to the tracking arm 24 (perpendicular to the surface of the disk). A counterweight 82 is positioned at the distal end of the support arms 56, 58 to balance the weight of the focus arm 26 and its components about the shaft 62.

It should be appreciated, however, that the relative position of the counterweight 82 and VCM 70 can be switched and the same results achieved. As a result of the balanced nature of the focus arm 26, the VCM 70 can more easily adjust the position of the focus arm 26 to focus the objective lens relative to the data surface of the disk. In addition, a key advantage of a balanced focus arm is its ability to withstand substantially larger shock and/or vibration ID forces than an unbalanced arm, without incurring a position error of the OPU 22 relative to the data track.

Figure 3:
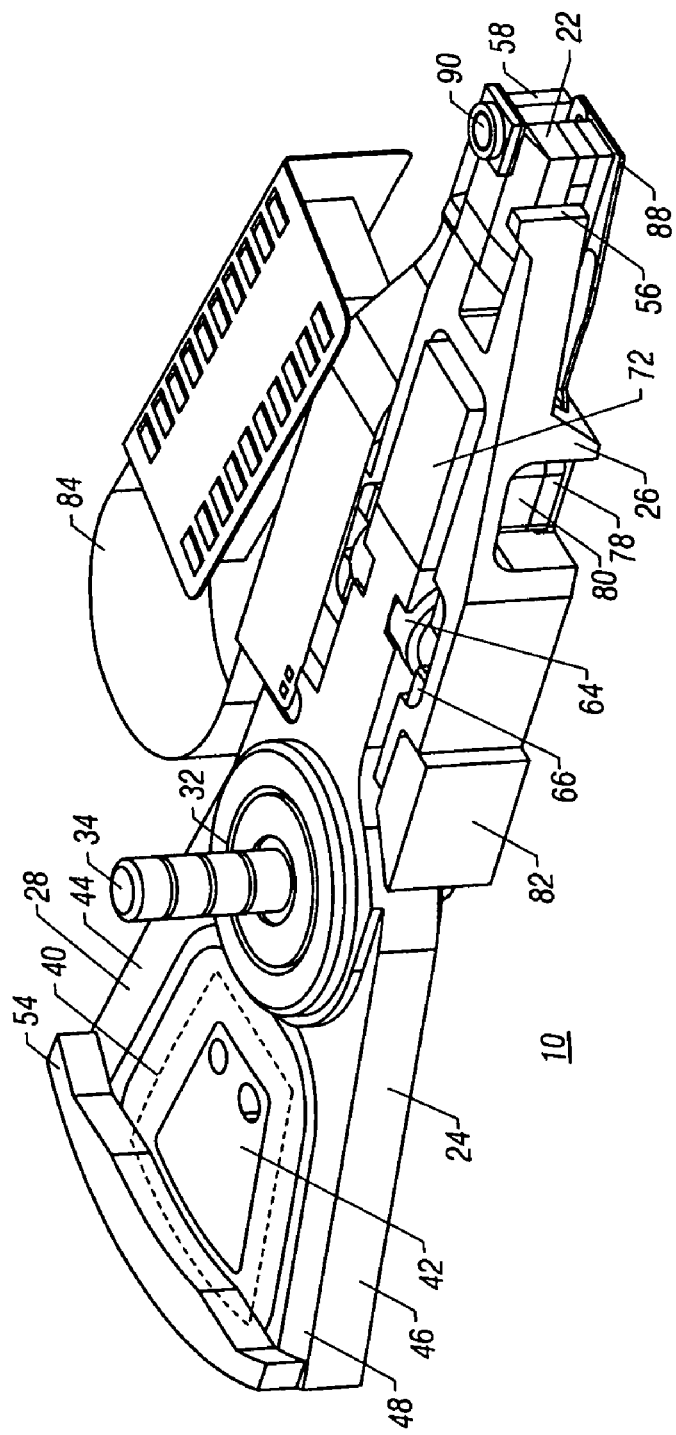
FIG. 3 is a three-quarter perspective view of a first embodiment of a tilt focus mechanism of the present invention.
Figure 9:
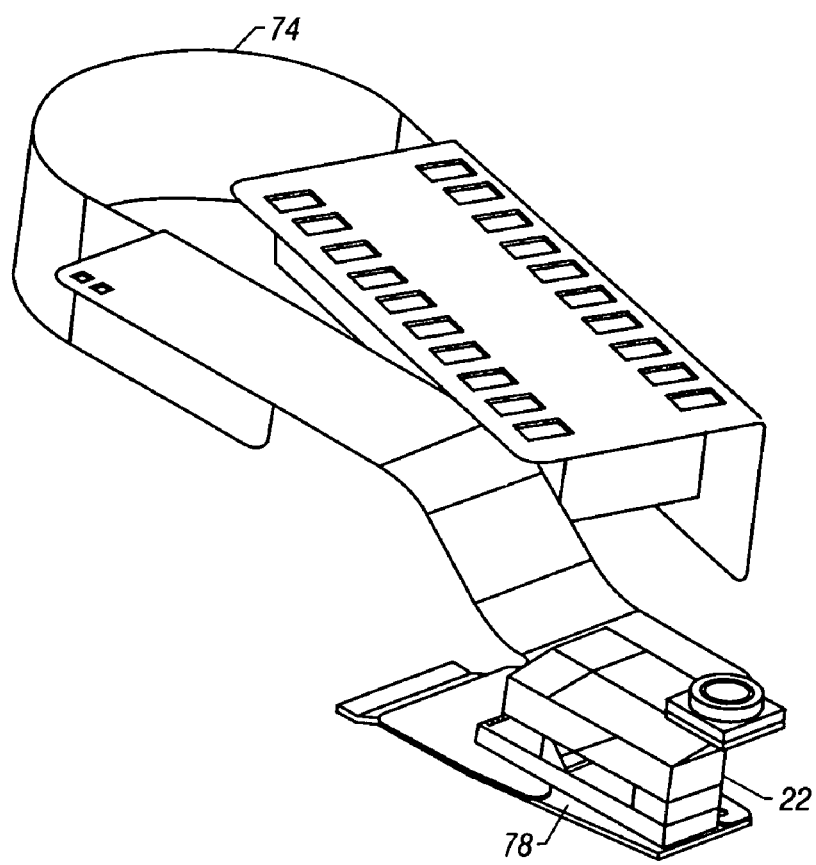
FIG. 9 is a three-quarter perspective view of the flex circuit, optical pick up unit and heat sink of the tilt focus mechanism of FIG. 3.
Figure 13:
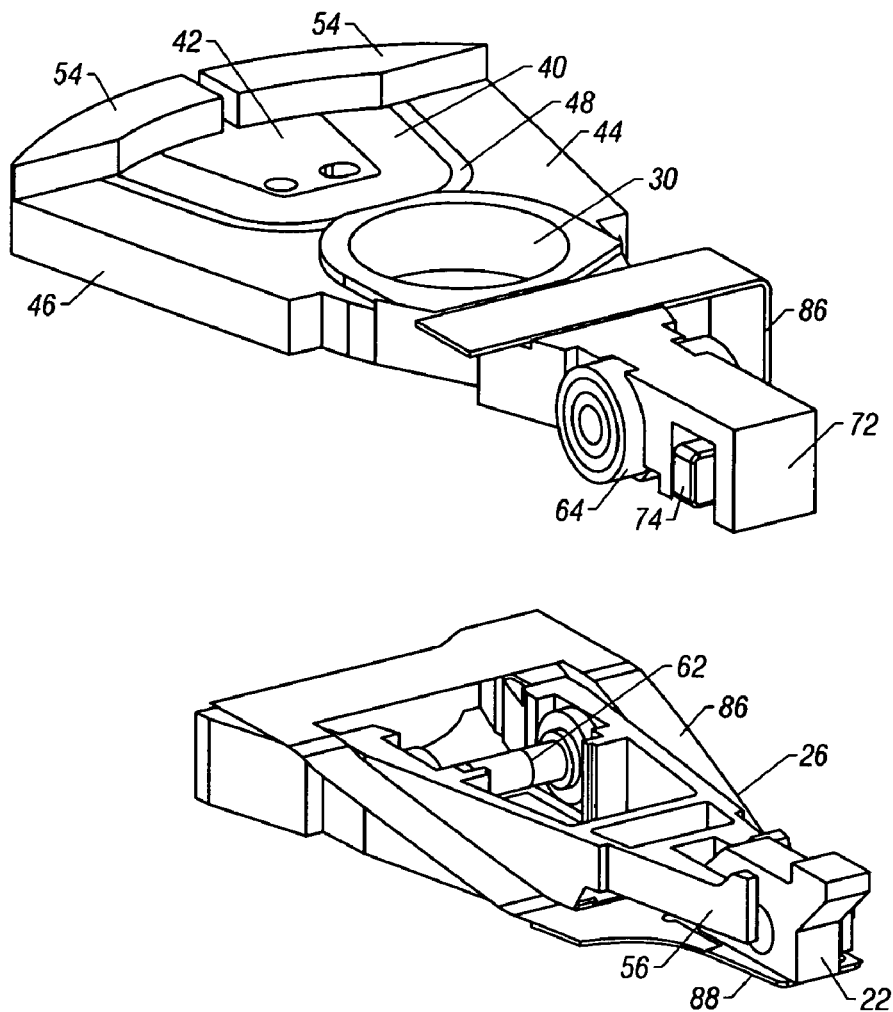
FIG. 13 is a three-quarter perspective view of a tracking arm and focus arm of a second embodiment of the tilt focus mechanism of the present invention.

A flex assembly or flex circuit 84 is affixed to the tracking arm and focus arm to carry signals between the OPU 22 and appropriate processors mounted on a printed circuit board and maintained in the housing 14 of the optical drive. Two different embodiments of the flex assembly 84 are shown in the drawings with this embodiment. As shown in FIGS. 3 and 9, a first version of the flex circuit 84 is mounted to a bracket 86 affixed to the tracking arm 24 and is positioned along one side of the focus arm 26, attaching to the underneath side of the focus arm 26 at its distal end. Alternatively, as shown in FIGS. 4 and 13, the flex circuit 84 includes a rectangular bracket 86 which is positioned along both sides of the focus arm 26. Both flex circuits 84 are designed to pivot in all three directions of movement of the tilt focus mechanism 10 so as not to inhibit movement of the tilt focus mechanism. A heat sink 88 may be included in either version at the location where the OPU 22 attaches to the flex circuit 84 to facilitate dissipation of heat generated by the operation of the laser resident in the OPU 22.

In operation, servo information embossed or otherwise residing in the data layer of the optical disk is monitored by the optical pick up unit 22 and sent to appropriate processors over the flex cable 84. Based upon the servo information, a processor (not shown) directs current to flow through coil 40 thereby creating a magnet field which induces movement of the tracking arm 24. The magnitude of the movement of the tracking arm is controlled by a processor. In this manner, the tracking arm 24 can move the OPU 22 across the entire disk surface to move from one track to another or can minimally adjust the position of the OPU 22 to maintain its position over a desired track. In other words, the tracking arm 24, including VCM 28, provides single stage tracking, i.e., both coarse and fine tracking.

Figure 10:
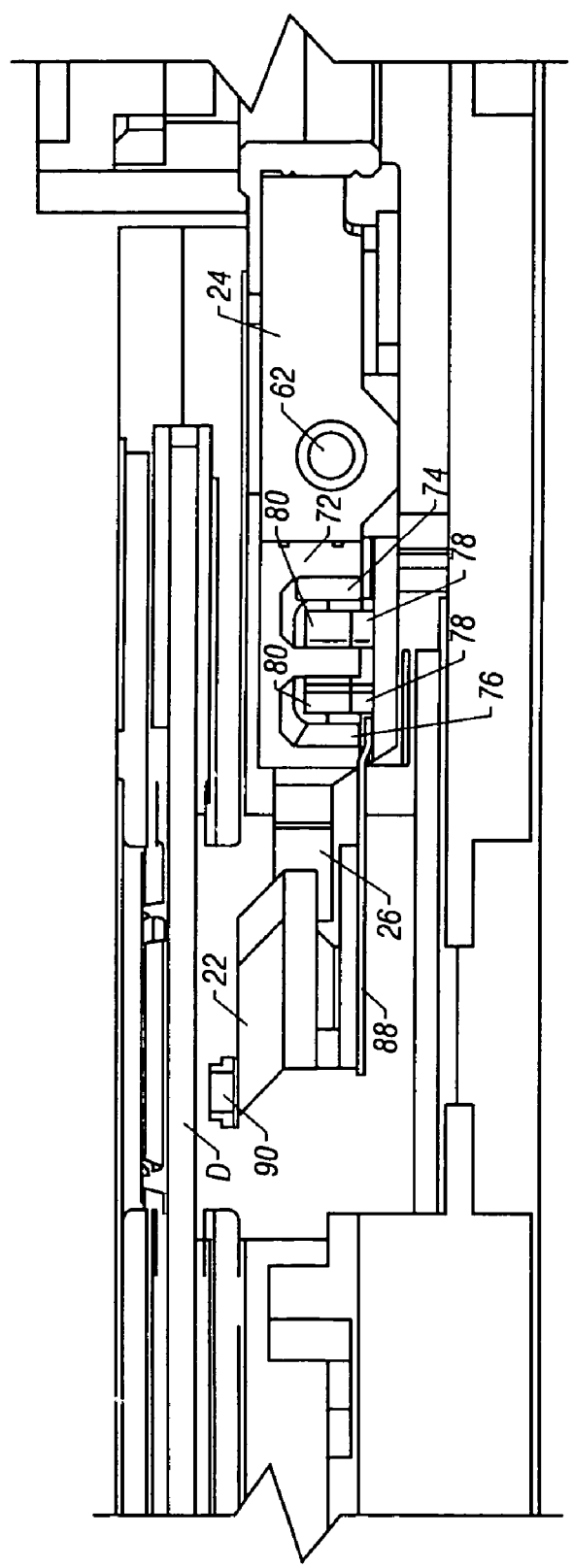
FIG. 10 is a cross-sectional view of a disk drive showing the tilt focus mechanism of FIG. 3, with the objective lens in a normal position relative to the optical disk.
Figure 11:
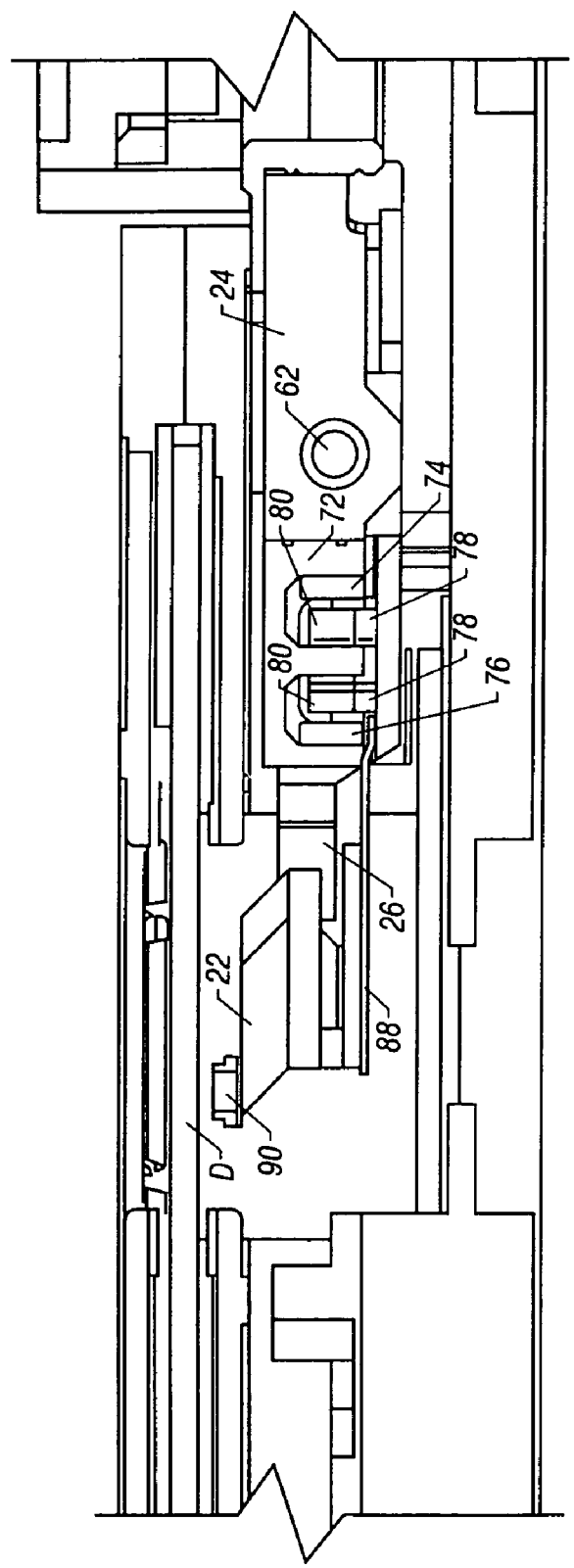
FIG. 11 is a cross-sectional view of an optical disk drive containing the tilt focus mechanism of FIG. 3, further showing the objective lens pivoted 0.6 degrees closer to the optical disk.
Figure 12:
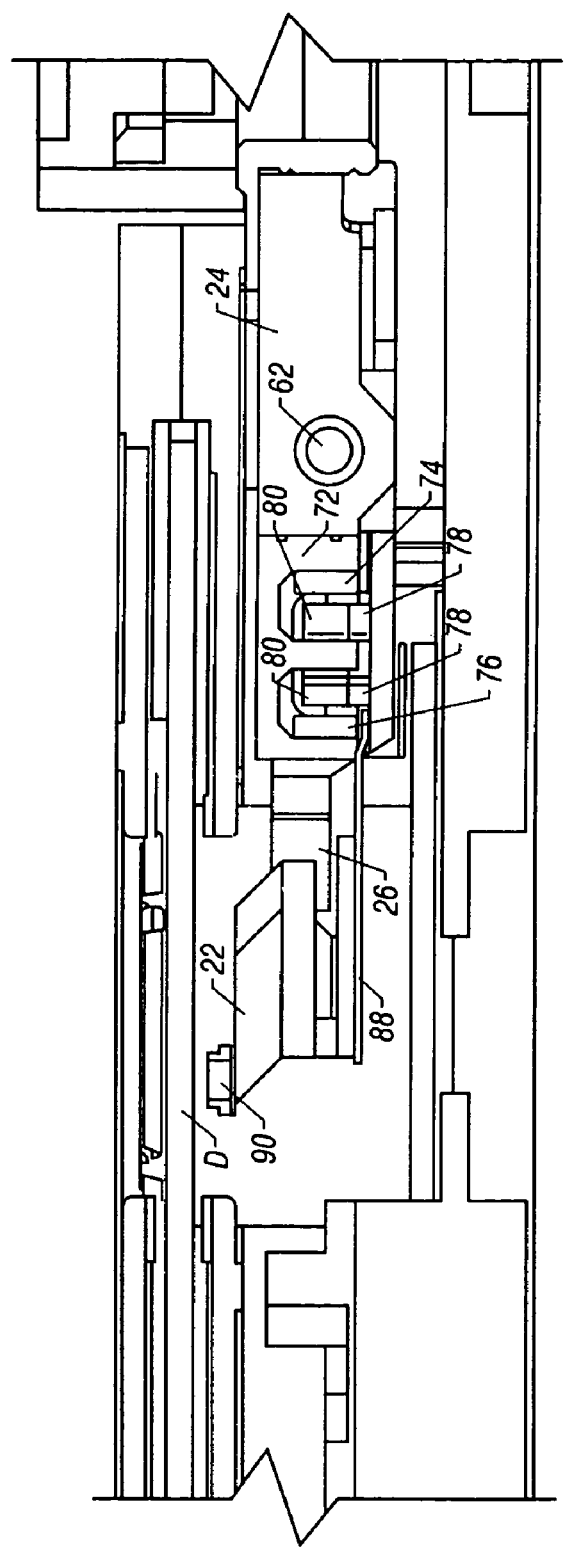
FIG. 12 is a cross-sectional view of an optical disk drive containing the tilt focus mechanism of FIG. 3, further showing the objective lens pivoted 0.6 degrees away from the optical disk.

In comparison, VCM 70 similarly adjusts the position of the OPU 22, but in a direction substantially perpendicular to the disk surface. This orthogonal component of this movement repositions the OPU 22 and its objective lens 90 to accommodate for disk flatness, variations in thickness in the disk layers, vibrations imparted into the system by the various motors, bearing defects, spindle motor run out and any other imperfections that can lead to orthogonal misalignment of the OPU 22 relative to the data tracks. For example, if the disk is created in such a manner that the surface of the data layer fluctuates, the optical feed back to the processors can sense a change in the quality of the light beam and adjust the position of the OPU 22 using VCM 70 to correct for misalignment between the OPU 22 and the data layer. These adjustments are made dynamically to thereby decrease read/write errors and enhance performance. This adjustment is illustrated in FIGS. 10-12 which provide a cross-sectional view of the tilt focus mechanism 10. FIG. 10 shows the optical drive with the OPU 22 in its normal position, with the objective lens 90 perpendicular to the surface of the disk "D." FIG. 11 shows the focus arm 26 repositioned such that the objective lens 90 is rotated 0.6 degrees closer to the disk drive surface. As a result, the spacing between the objective lens 90 and the surface of the disk "D" is decreased. Conversely, FIG. 12 shows the focus arm 26 repositioned with the objective lens 90 0.6 degrees further away from the surface of the disk "D." Thus, the range of movement of the focus arm allows the objective lens to maintain the light beam in a focused condition through a range of 1.2 degrees of movement thereby compensating for imperfections in the disk, the manufacture and assembly of the drive components and external shock or vibration. It should be appreciated that the range of motion can be increased or decreased and that the present invention is not limited to this particular embodiment or range of motion. The size of the objective lens and its focal length are an important factor in determining the amount of deviation from perpendicular that any system can accommodate.

Figure 14:
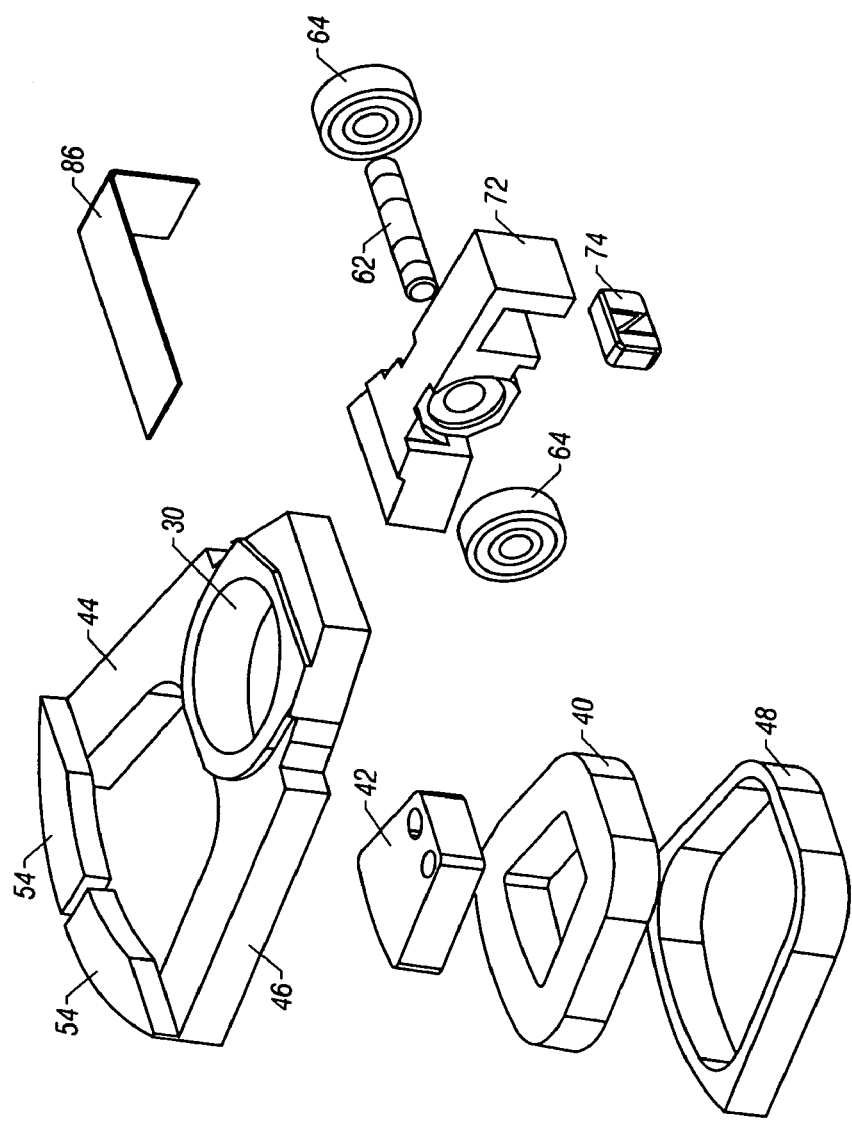
FIG. 14 is an exploded perspective view of the tracking arm of the embodiment shown in FIG. 13.
Figure 15:
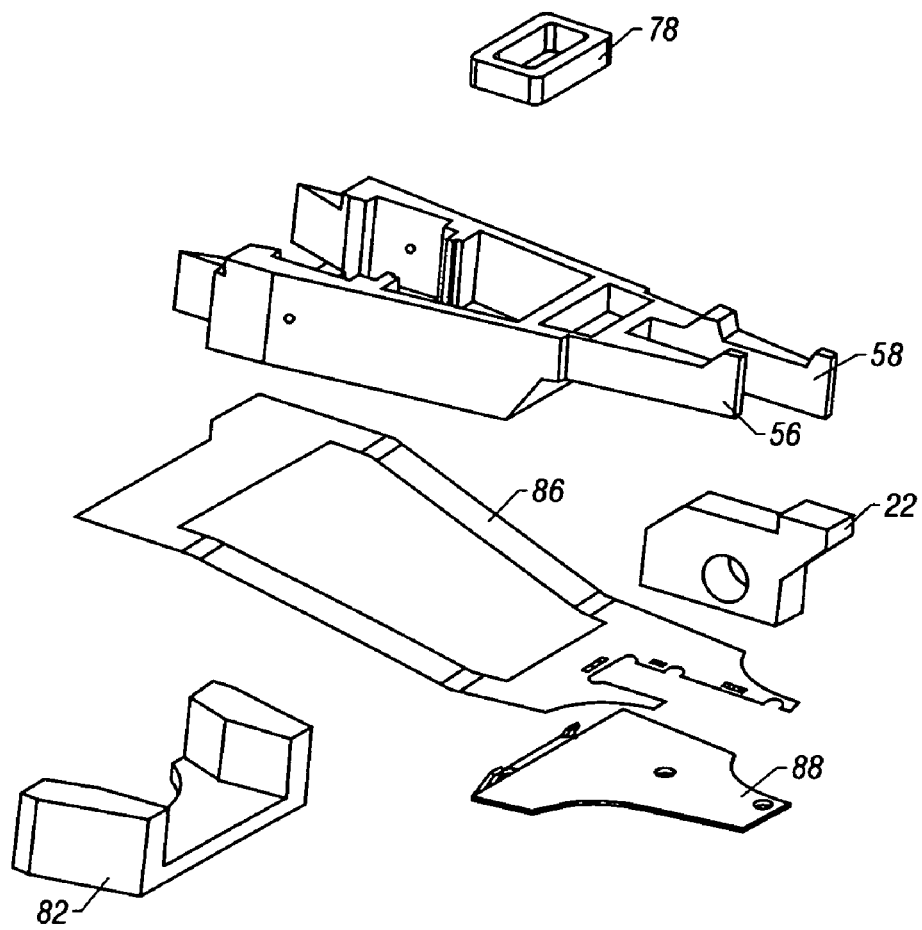
FIG. 15 is an exploded perspective view of the focus arm of the tilt focus mechanism shown in FIG. 13.
Figure 16:
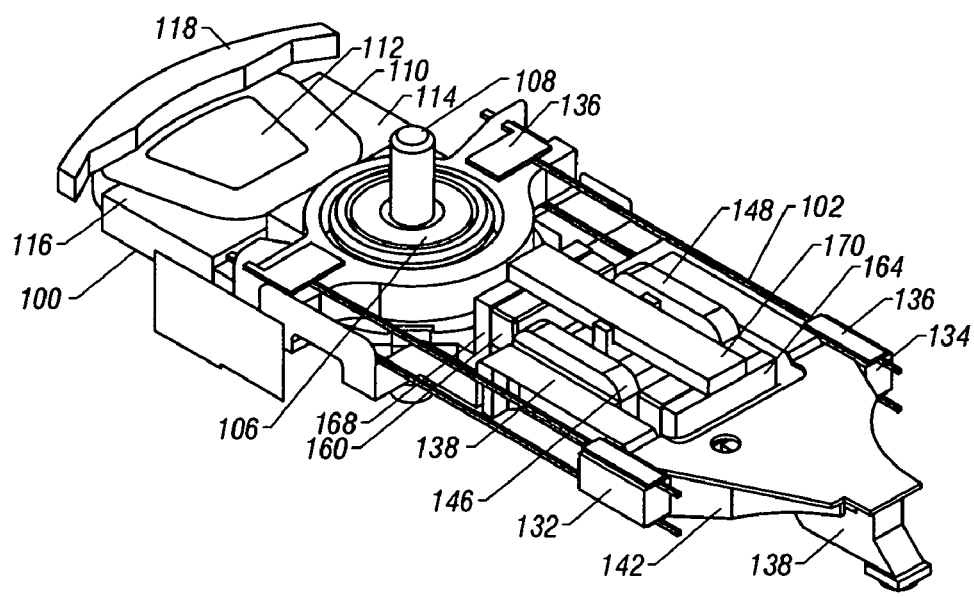
FIG. 16 is a three-quarter perspective view of a third embodiment of the tilt focus mechanism of the present invention.
Figure 17:
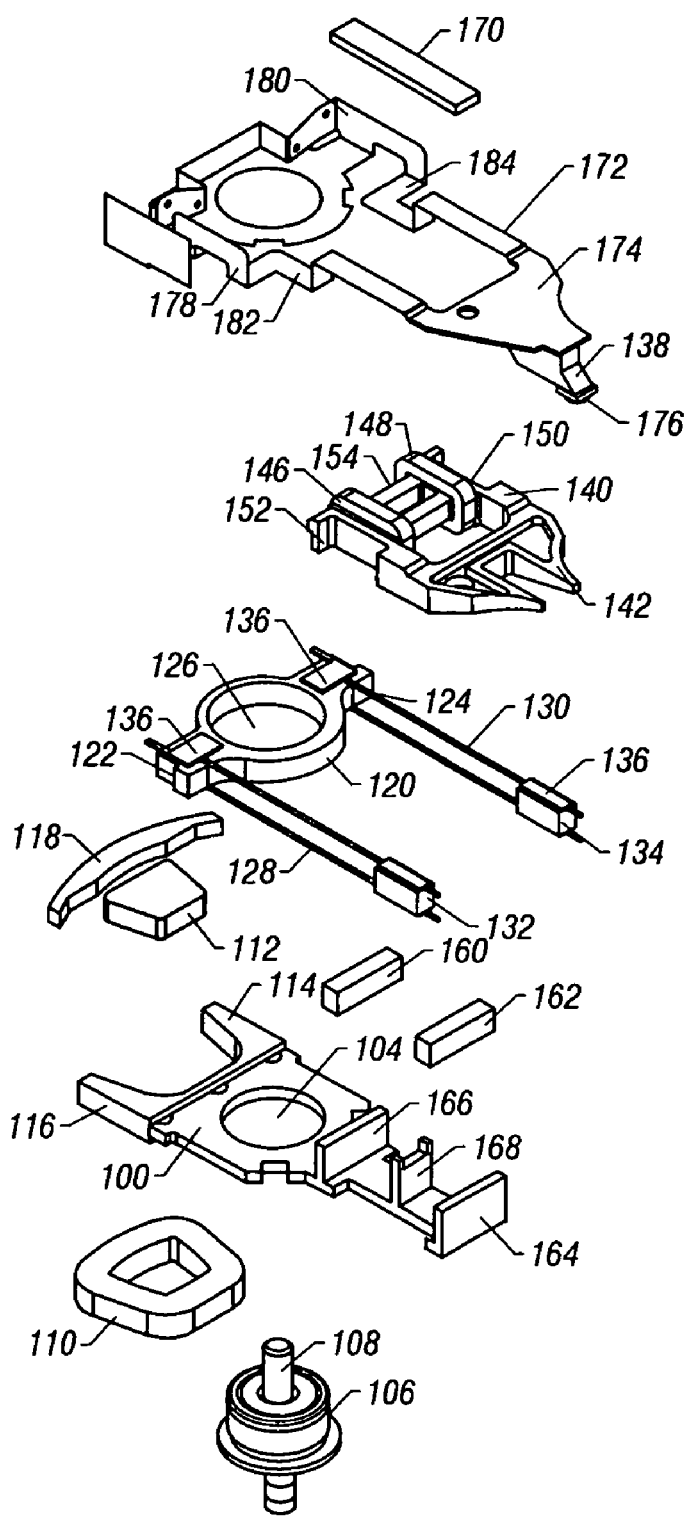
FIG. 17 is an exploded view of the tilt focus mechanism shown in FIG. 16.

A variation of the foregoing embodiment is illustrated in FIGS. 13-15. In this embodiment, the VCM 70 utilizes a single permanent magnet 74. As a result, the VCM frame 72 is smaller and lighter in weight. Because of its lighter weight, the components of VCM 28 can be made smaller, as less torque is required to move the tilt focus mechanism 10. More specifically, the coil 40 and bobbin 42 may be made smaller, as can the rear end of the tracking arm 24 supporting the VCM 28. With less mass, the counterweight 54 may also be smaller. A lighter weight and smaller tilt focus mechanism 10 will achieve faster seek times and be more accurate. It will also be more compact, allowing further miniaturization. As with the previous embodiment, the general location of the counterweight 54 and VCM 70 may be switched.

A third embodiment of the present invention is shown in FIGS. 16-22. In general, this embodiment includes a tracking arm 100 for course movement in the X-Y direction (parallel to the surface of the optical disk) and a focus arm 102 for fine tracking and for focus movement in the Z direction (perpendicular to the disk surface). Thus, unlike the tracking arm 24 in the first two embodiments, tracking is accomplished by two stages rather than one. Like the tracking arm 24 in the first two embodiments, the tracking arm 100 includes a bearing mount bore 104 for receiving a bearing cartridge 106 which allows the tracking arm 100 to pivot about a shaft 108 mounted between a tracking VCM return plate and a VCM magnet plate (not shown) of the optical drive. As should be appreciated by one skilled in the art, as an alternative, the shaft 108, in this embodiment or in any of the disclosed embodiments, may be fixed or stationary. A coil 110, wound around bobbin 112, is mounted between a pair of support members 114, 116 at the rearward end of the tracking arm 100, together with the counterweight 118. Magnets (not shown) are positioned adjacent the coil 110 to form a voice coil motor to provide a directional torque based upon the direction of current induced in the coil 110 to move the tracking arm 100 relative to the surface of the optical disk. It should be appreciated that the coil 110 may be stationary and the magnets may be positioned on the tracking arm 100 and move with the tracking arm.

Figure 22:
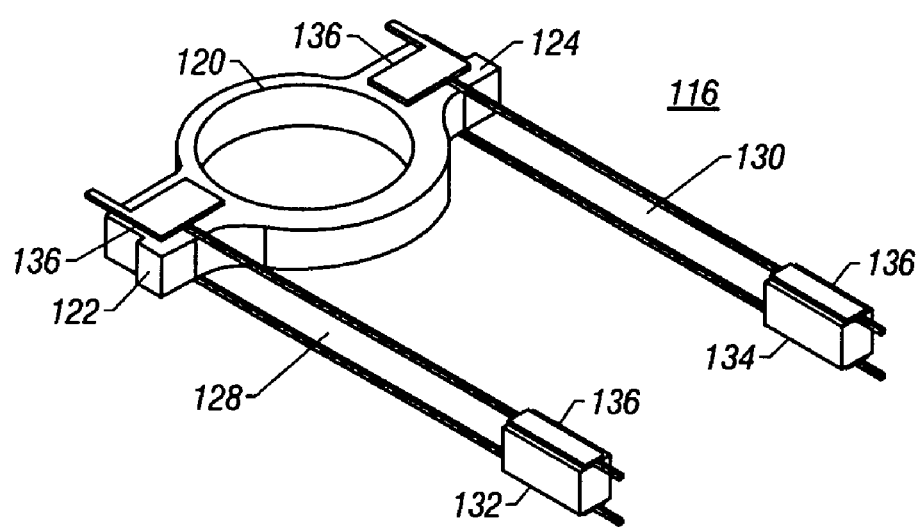
FIG. 22 is a three-quarter perspective view of the suspension assembly for the tilt focus mechanism of the embodiment shown in FIG. 16.
Figure 23:
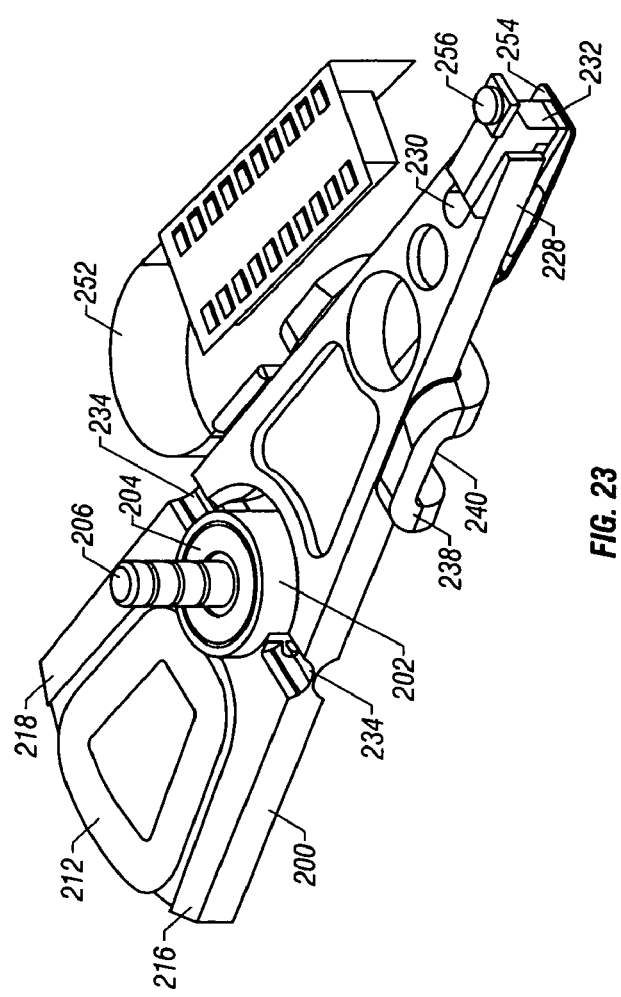
FIG. 23 is a three-quarter perspective view of a fourth embodiment of the tilt focus mechanism of the present invention.
Figure 24:
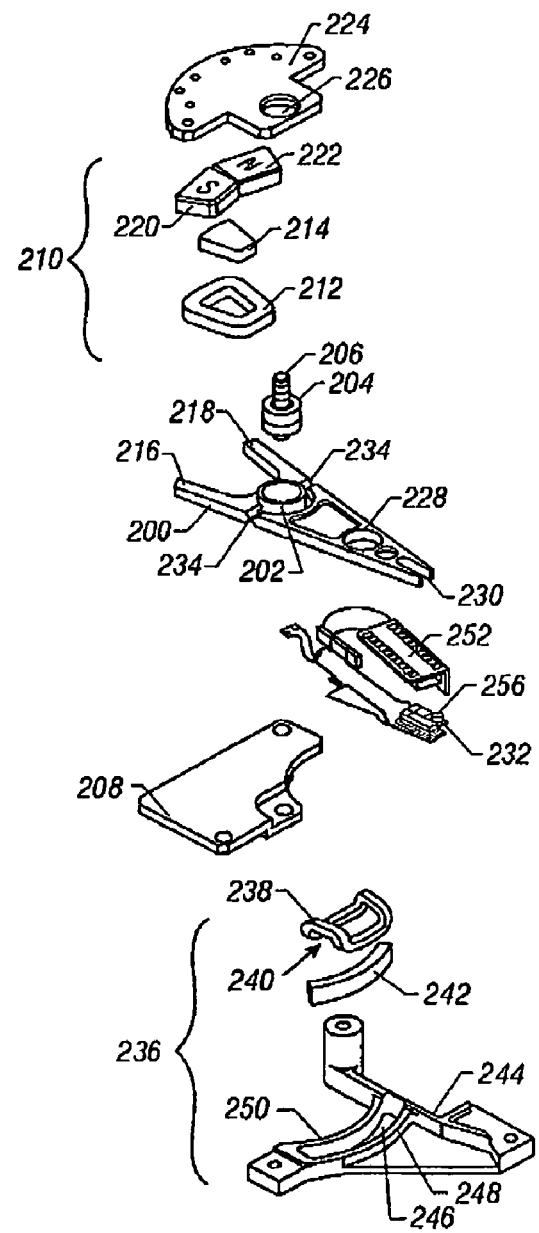
FIG. 24 is an exploded view of the tilt focus mechanism shown in FIG. 23.
Figure 25:
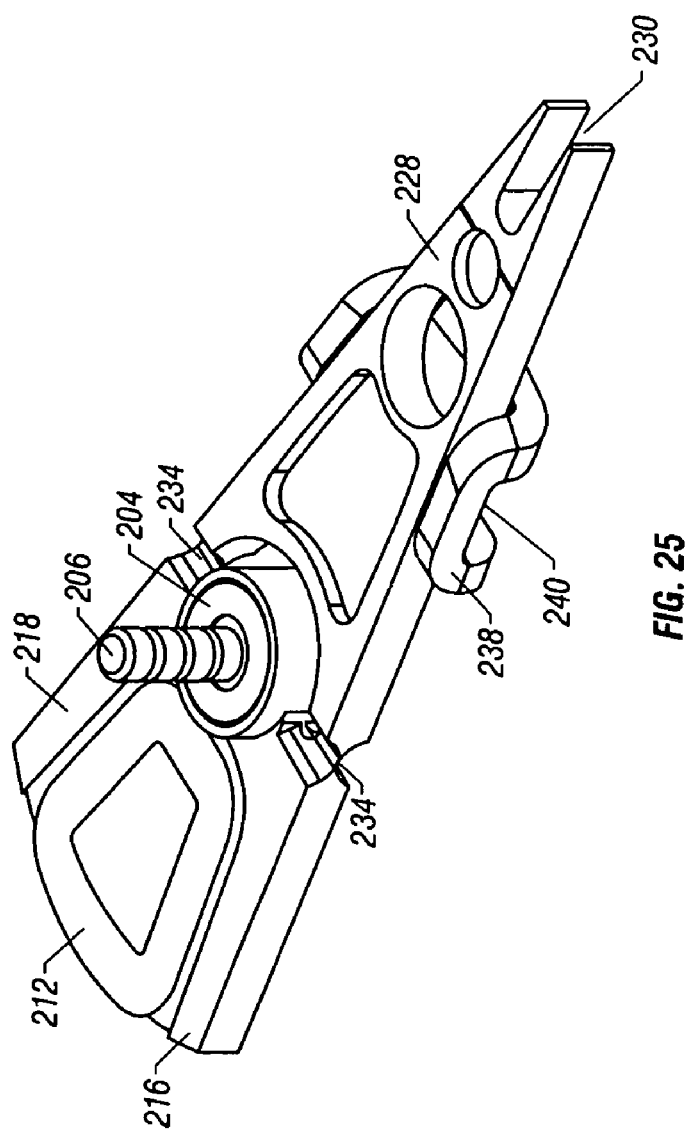
FIG. 25 is a three-quarter perspective view of the tracking arm and focus arm of the tilt focus mechanism shown in FIG. 23.
Figure 26:
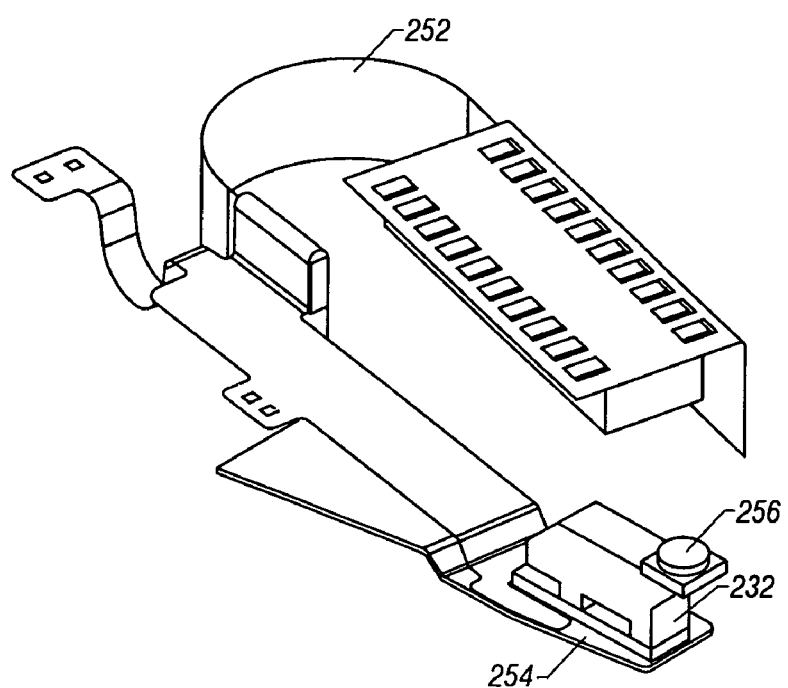
FIG. 26 is a three-quarter perspective view of the flex circuit, optical pick up unit and heat sink of the tilt focus mechanism shown in FIG. 23.

As best seen in FIG. 22, a suspension member 116 for supporting and positioning the focus arm 102 comprises a cylindrical yoke 120 with two shoulders 122, 124 extending outwardly from the yoke 120 in opposite directions. The bearing assembly 106 fits inside the open center 126 of the yoke 120. Two pair of parallel support wires 128, 130 extend forward from the suspension member 116 and terminate in a pair of front suspension mounts 132, 134. The support wires are enlarged at location 136 (on the top and bottom surfaces of the yoke 120 and front suspension mounts 132, 134) to facilitate stability and mounting between the support wires 128, 130, the yoke 120 and the forward suspension mounts 132, 134. The focus arm 102 attaches to the front suspension mounts 132, 134 and moves relative to the tracking arm 100 by a flexing of the suspension wires 128, 130. Unlike the previously discussed embodiments, the present embodiment of the focus arm is unbalanced and, therefore, the focus arm 102 is subject to constant adjustment in order to maintain proper position. Such constant adjustment can drain power, particularly if the weight of the components of the focus arm 102 is not minimized. Also, as an unbalanced member, it is more susceptible to misalignment errors created by shock or vibration. It may therefore be advisable to place physical limits on the range of movement of support wires 128, 130 to prevent them from moving past their elastic limit as a result of an external shock.

The focus arm 102 is moved relative to the tracking arm 100 by a hybrid pair of voice coil type motors for both fine tracking and focus of the OPU 138 disposed at the end of the focus arm 102. A fine positioning actuator 140 is mounted between the front suspension mounts 132, 134. The fine actuator 140 includes a forward portion 142 with a cutout 144 for housing the OPU 138. Fine tracking coils 146, 148 are positioned between a pair of rear suspension arms 150, 152 of the fine actuator 140. A focus coil 154 is positioned perpendicular to and within the center cavity 156, 158 of the fine tracking coils 146, 148.

Figure 18:
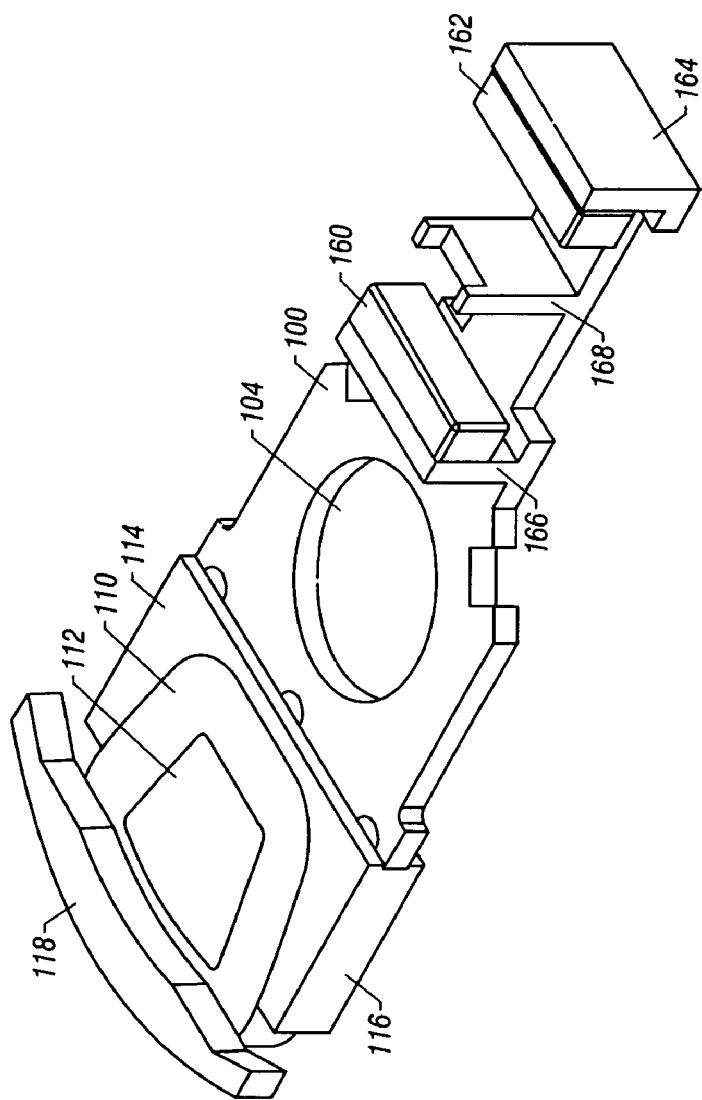
FIG. 18 is a three-quarter perspective view of the tracking arm of the tilt focus mechanism shown in FIG. 16.
Figure 19:
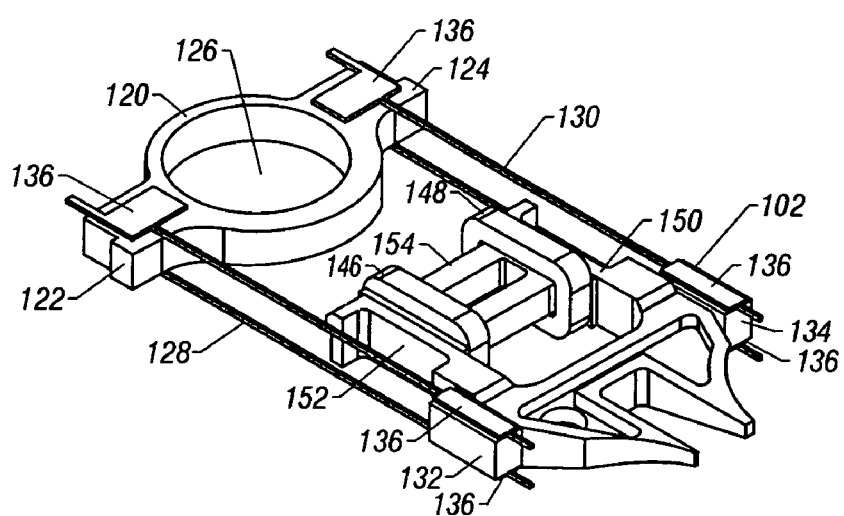
FIG. 19 is a three-quarter perspective view of the focus arm of the tilt focus mechanism shown in FIG. 16.
Figure 20:
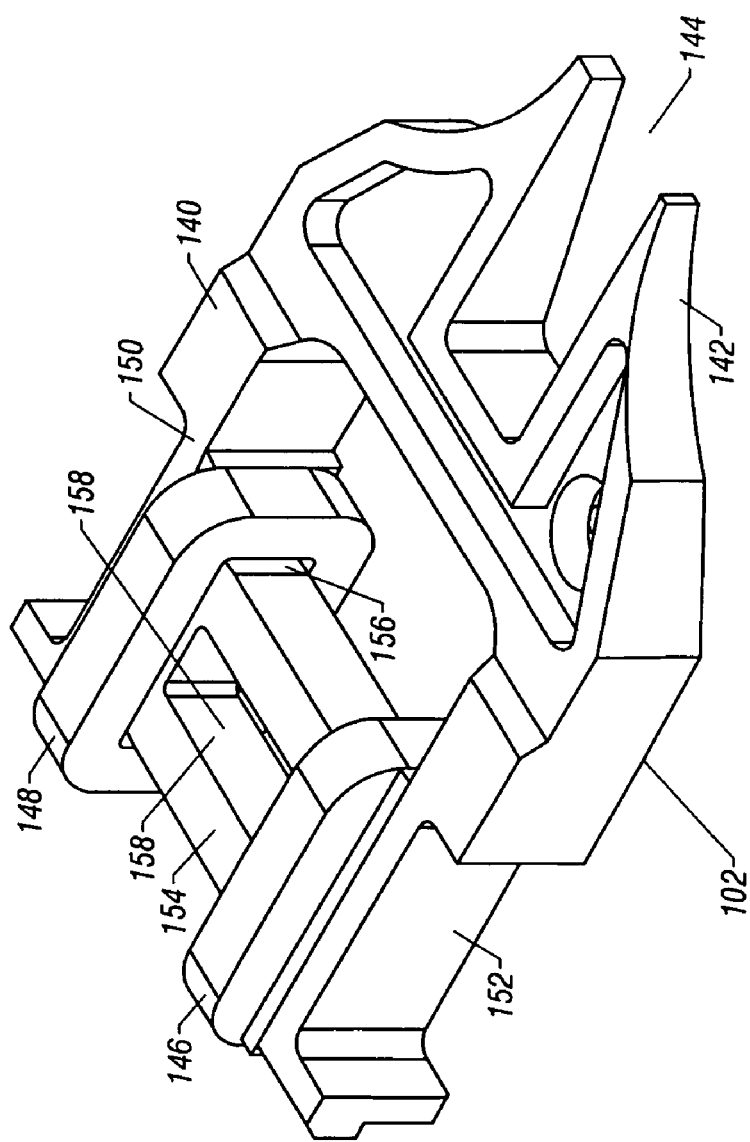
FIG. 20 is a three-quarter perspective view of the fine actuator of the tilt focus mechanism shown in FIG. 16.

The fine tracking coils 146, 148 and focus coil 154 coact with a pair of permanent magnets 160, 162 mounted to the tracking arm 100 (FIG. 18). The tracking arm 100 also includes a pair of VCM end returns 164, 166, a center return 168 and a top plate 170 to create a magnet flux path in association with the hybrid voice coil motor. It should be appreciated, as a further alternative, that the coils 146, 148 and 156 could be mounted on the tracking arm 100 and the magnets 160 and 162 positioned on the fine actuator 140.

Figure 21:
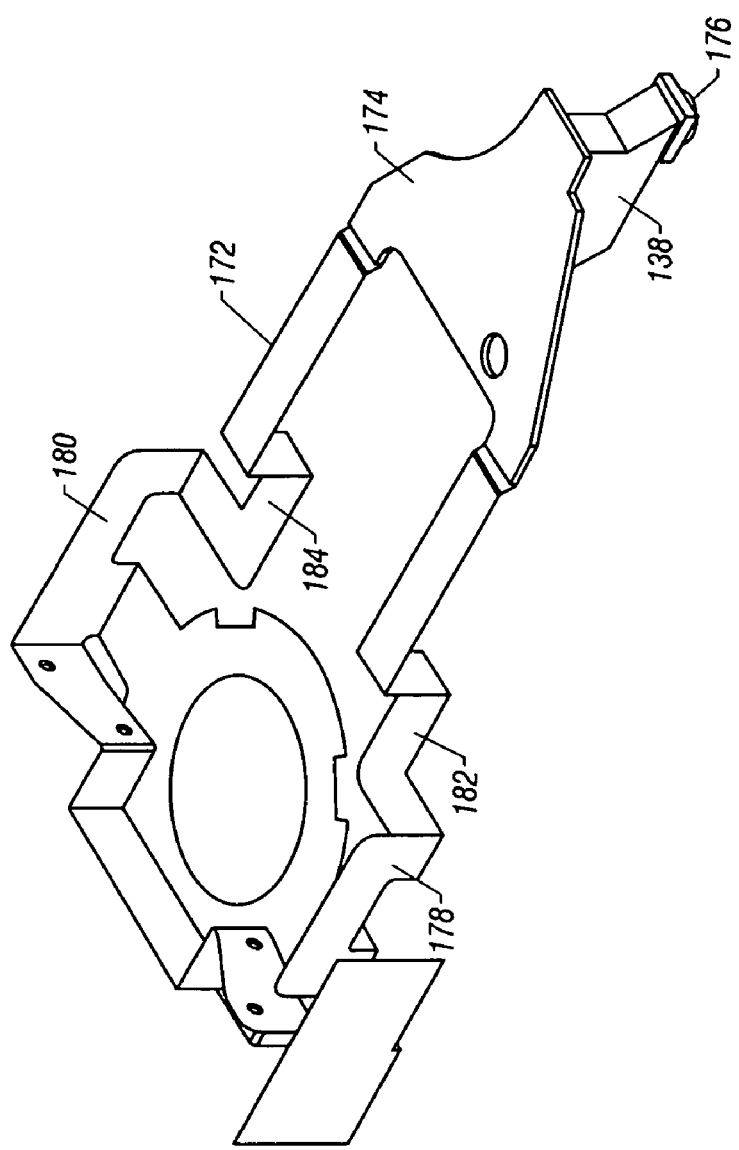
FIG. 21 is a three-quarter perspective view of the flex circuit of the tilt focus mechanism shown in FIG. 16.

A flex circuit 172, shown in FIG. 21, provides a communication path between the OPU 138 and the drive processors (not shown). In addition, a heat sink 174 may be added to facilitate removal of heat generated by the laser within the OPU 138, as well as due to constant positioning of the fine actuator 140 for focusing, fine tracking and positioning of the objective lens 176.

Applying a current to the fine tracking coils 146, 148 creates a force on the focus arm 102 generally parallel to the disk surface, i. e. in the X-Y plane. This causes the support wires 128, 130 to bend sideways or laterally, moving the OPU 138 and objective lens 176 generally parallel to the disk surface for fine tracking purposes. The flex circuit 172 includes flat portions 178, 180 which accommodate bending in the X-Y direction. Applying a current to the focus coil 154 will create a force which moves the OPU 138 in a direction generally perpendicular to the disk surface, i.e. in the Z direction. As compared to the other embodiments described herein, the four bar linkage created by support wires 128, 130 will tend to maintain the objective lens perpendicular to the surface of the disk, rather than move the objective lens through an arcuate path. Flat portions 182, 184 of the flex circuit 172 bend in response to the force created by the focus coil 154. This movement allows the OPU 138 and objective lens 176 to move and maintain focus.

A fourth embodiment is disclosed in FIGS. 23-29. In general, this embodiment comprises a single actuator arm 200 having a bearing bore mount 202 which mounts to a bearing cartridge 204. The bearing cartridge 204 is rotatably connected to a shaft 206 mounted between a tracking VCM return plate 208 and the cover or a similar cap structure (not shown). For coarse and fine tracking purposes, the actuator arm 200 moves in a conventional manner responsive to torque induced by VCM 210. The VCM 210 comprises a coil 212 wound around a bobbin 214 placed within a pair of arms 216 and 218 at the rear end of the actuator arm 200. Permanent magnets 220 and 222, in cooperation with alternating current flowing in the coil 212 and the return path provided by tracking VCM return plate 208 and tracking VCM magnet plate 224, create the necessary torque to pivot the actuator 200 about the shaft 206. The tracking VCM magnet plate 224 further includes an aperture 226 to provide clearance for the shaft 206 and bearing cartridge 204 to be secured between the VCM return plate 208 and the cover. As will be appreciated, the components of the VCM 210 may be switched relative to each other such that the coil 212 is stationary and the magnets 220, 222 move with the actuator arm 200.

Figure 27:
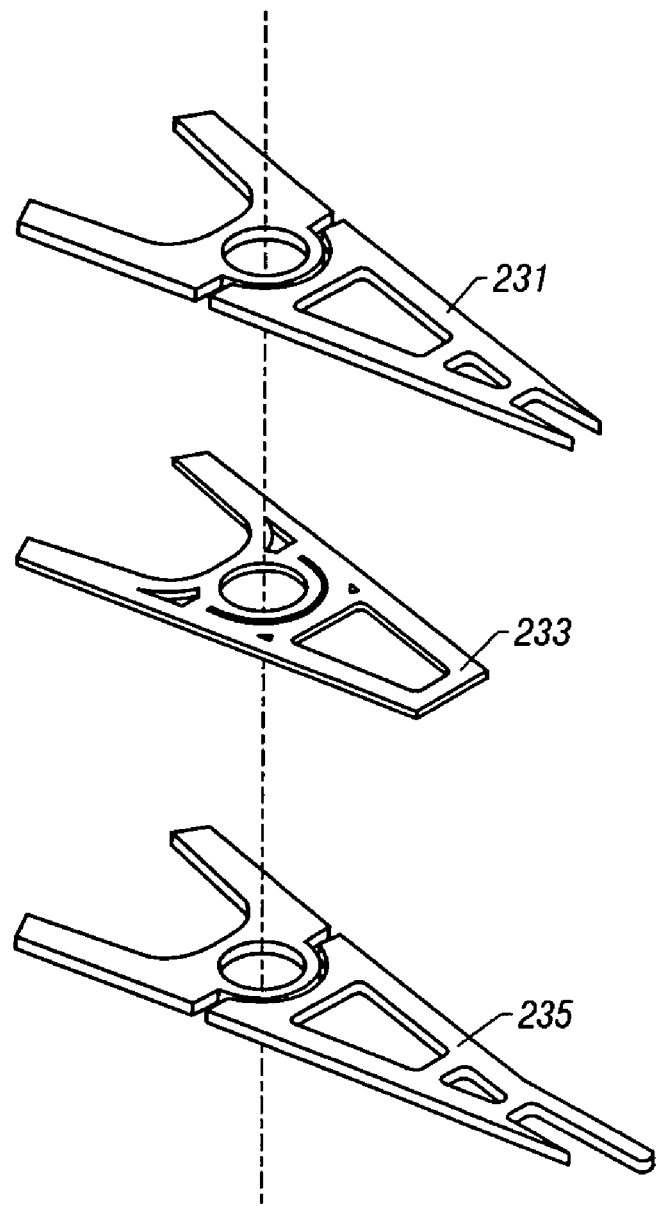
FIG. 27 is an exploded perspective view of an alternative embodiment of the actuator arm of FIG. 23.
Figure 28:
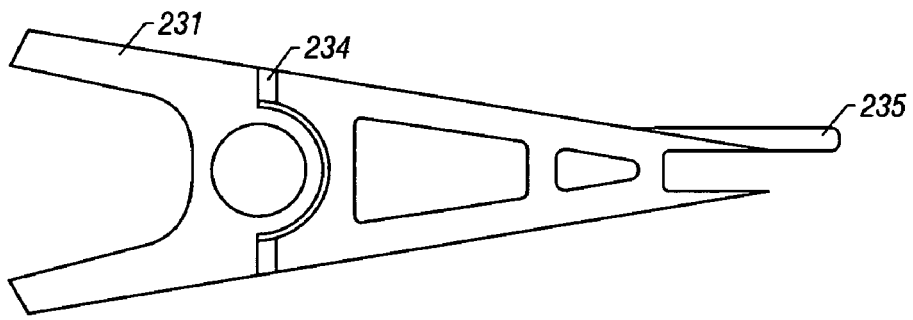
FIG. 28 is an elevated plan view of the embodiment of FIG. 27.
Figure 29:
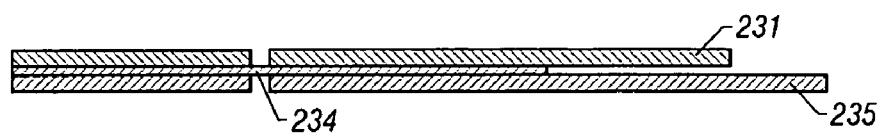
FIG. 29 is an elevated side view of the embodiment of FIG. 27.

This embodiment utilizes an unbalanced focus structure. The focus arm 228 of the actuator 200 includes a number of cutouts to lessen its weight. Additionally, a slot 230 at the distal end is adapted to receive OPU 232. Movement of the focus arm 228 of the actuator 200 in the Z direction (perpendicular to the disk surface) is accomplished by an integral flexure pivot 234 in the actuator 200 adjacent the bearing bore mount 202. It should be understood, however, that the flexure need not be integral to the actuator 200, but may be a separate piece or layer in a laminated composite structure. For example, the laminate structure may comprise a carbon fiber composite upper layer 231, a metal center layer which includes the flexure 233, and a carbon fiber layer 235, as shown in FIGS. 27-29.

A focus VCM 236 acts to move the focus arm 228 of the actuator 200 (the focus arm) in the Z direction. The VCM 236 comprises a coil 238 mounted to the focus arm 228. The shape of the coil 238 forms a channel 240 which surrounds a permanent magnet 242 mounted within a VCM block 244. More specifically, the permanent magnet 242 is positioned within a slot 246 formed in the VCM block 244. However, it should be appreciated that the shape of the coil may vary without effecting operation. For example, the coil 238 may be flat, i.e. two dimensional, rather than the three dimensional structure to) shown. The outer walls 248 and 250 of the VCM block 244 create the return path for the magnetic flux, allowing the focus arm 228 to move perpendicular to the surface of the disk as the overall actuator arm 200 moves parallel to the surface of the optical disk. In addition, the coil 238 may be stationary and the magnet 242 moves in association with the focus arm 228.

In this unbalanced embodiment, the voice coil motor 236 is positioned at the center of percussion for the focus arm 228. It is advantageous to locate the voice coil motor of the focus arm at, or as near as possible to, the center of percussion for the overall focus arm in any unbalanced embodiments, if possible. In this manner, the force generated by the focus arm VCM will minimize, or preferably eliminate, any detrimental excitation or resonance at the pivot point (i.e., flexure 234) for the focus arm which could otherwise negatively affect focus. If the VCM 236 were not positioned at or near the center of percussion, the force placed on the focus arm 228 by the VCM 236 could generate forces at the pivot point 234 which would interfere with the positioning of the focus arm, thereby potentially creating focus errors and, therefore, inhibit the ability of the system to read and write. As used herein, the term center of percussion is understood to have the meaning set forth in Mark's Standard Handbook for Mechanical Engineers ($8^{th}$ ed.), which is incorporated by reference A flex circuit 252, shown in FIGS. 23, 24 and,25, attaches along one side of the actuator 200. A heat sink 254 is included to dissipate heat created by the laser (not shown) housed within the OPU 232. Thus, as with the other embodiments, the objective lens 256 may be repositioned in the orthogonal direction relative to the disk surface in order to maintain focus.

As will be appreciated, the integral flexure pivot 234 is only one structure that allows for movement of the focus arm 228 in a direction perpendicular to the surface of the optical disk. First, the structure need not be a single piece of material, but may be multiple or separate pieces. Pivoting may be provided by any number of known mechanisms, including but not limited to a ball bearing pivot, a jewel bearing pivot, a knife edge pivot, or a torsional shear member pivot or any other type of pivot known by persons of skill in the art. While the various focus arms in the various embodiments illustrated herein can be lengthened to achieve a greater range of motion, the objective is to minimize the angular change of the objective lens for any given range of motion of the focus arm in the Z direction. This embodiment allows for the greatest range of movement of the objective lens with the least perpendicularity error.

Figure 30:
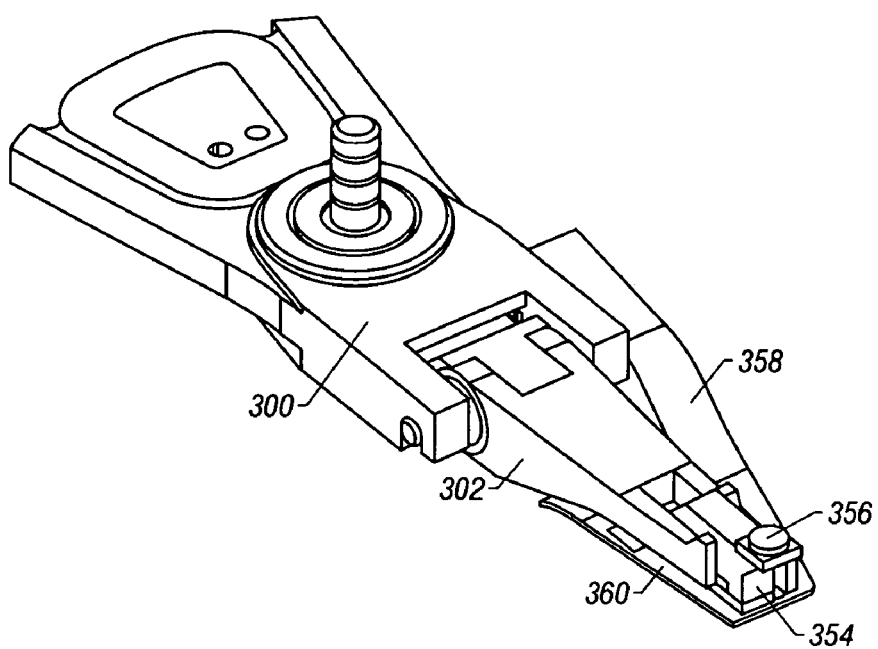
FIG. 30 is a three-quarter perspective view of a fifth embodiment of the tilt focus mechanism of the present invention.
Figure 31:
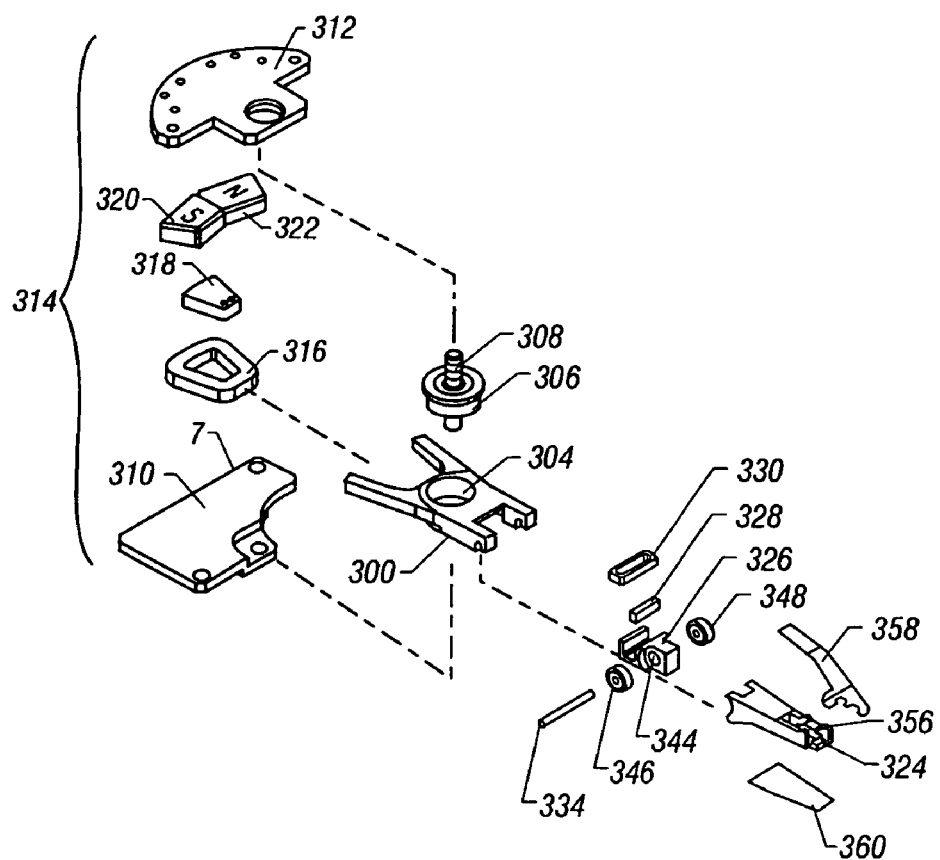
FIG. 31 is a three-quarter exploded view of the components of the tilt focus mechanism shown in FIG. 30.
Figure 32:
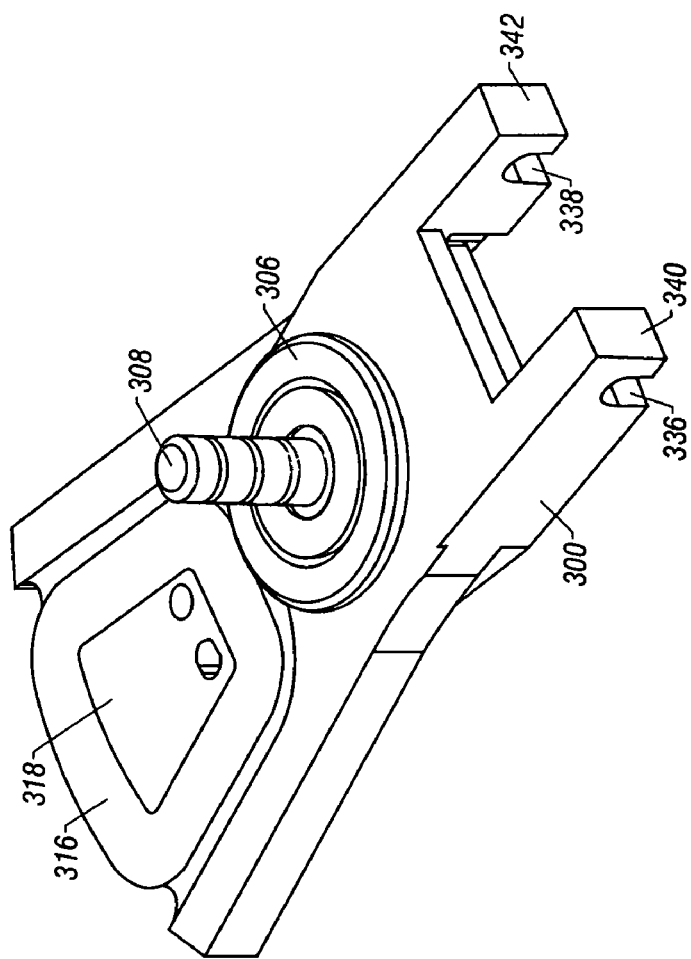
FIG. 32 is a three-quarter perspective view of the tracking arm of the tilt focus mechanism shown in FIG. 30.
Figure 33:
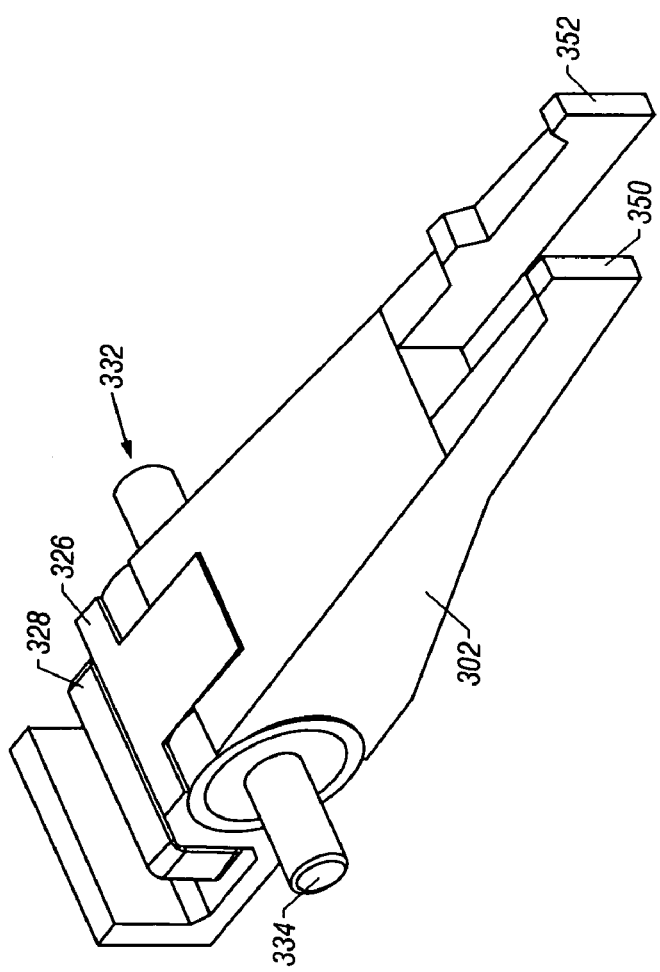
FIG. 33 is a three-quarter perspective view of the focus arm of the tilt focus mechanism shown in FIG. 30.
Figure 34:
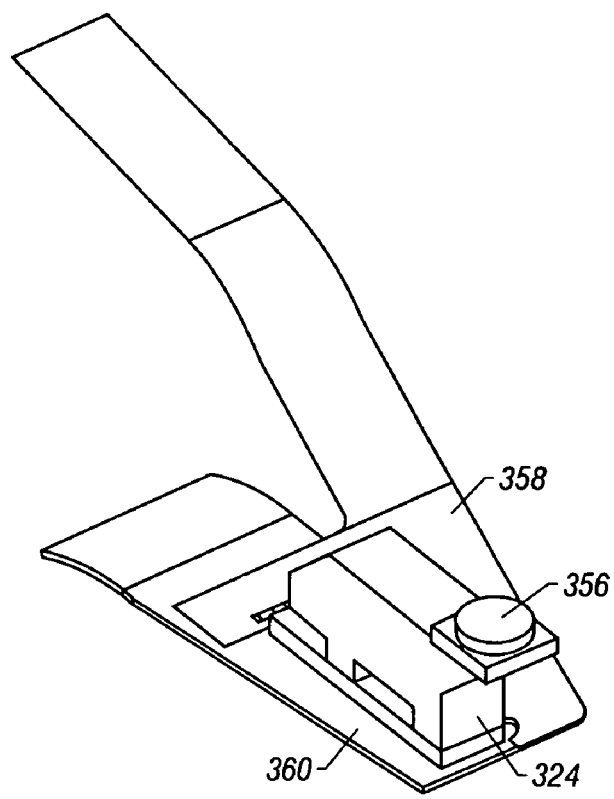
FIG. 34 is a three-quarter perspective view of the flex circuit, optical pick up unit and heat sink of the tilt focus mechanism shown in FIG. 30.
Figure 35:
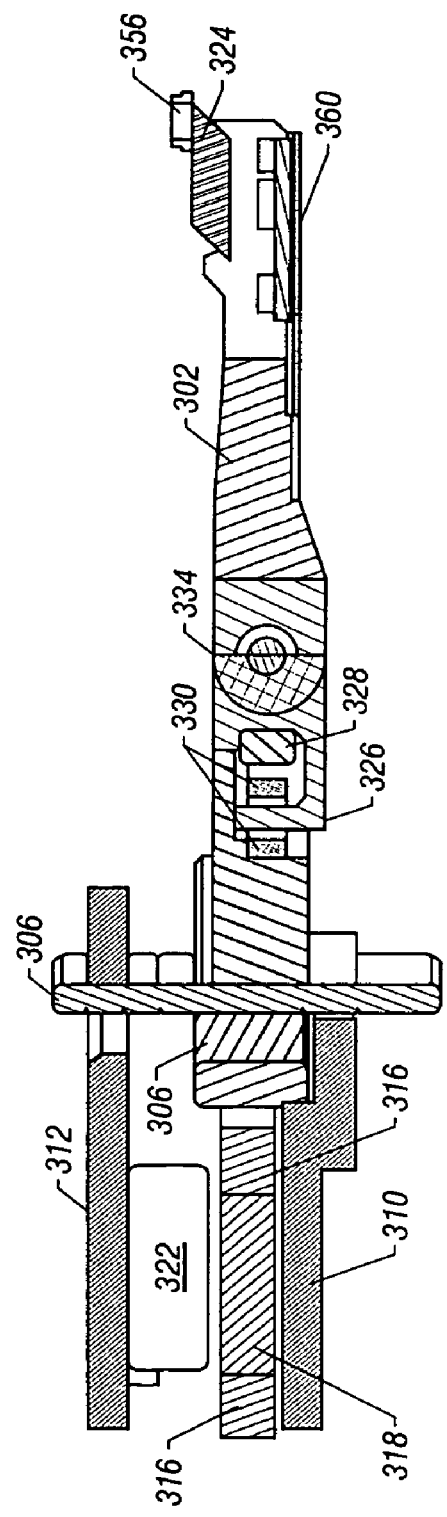
FIG. 35 is a cross-sectional view of the tilt focus mechanism shown in FIG. 30.

A fifth embodiment of the tilt focus mechanism 10 of the present invention is shown in FIGS. 30-35. As can be seen in FIG. 30, the tilt focus mechanism includes a tracking arm 300 and a focus arm 302. The tracking arm 300 is shown separately in FIG. 32 and the focus arm 302 is shown separately in FIG. 33, with the components of each shown in an exploded format in FIG. 31.

With reference to the tracking arm 300, a bearing bore mount 304 receives a bearing cartridge 306 which, in turn, mounts to a shaft 308. The shaft 308 is seated between a tracking VCM return plate 310 and a tracking VCM magnet plate 312. The rotational movement of the tracking arm 300 is provided by VCM 314, which includes a coil 316 wound around a bobbin 318. Permanent magnets 320 and 322, in combination with the VCM magnet plate 312, and return plate 310 and the coil 316, cause the tracking arm 300 to pivot about the shaft 308 and move the focus arm 302 parallel to the surface of the disk for coarse and fine positioning of the OPU 324 relative to the tracks in the optical disk.

In this embodiment, the focus arm 302 is balanced. As can be appreciated from FIG. 33, the VCM block 326, permanent magnet 328 and coil 330 are positioned on the opposite side of the pivot point 332 for the focus arm 302 than the OPU 324. The focus arm 302 moves in a direction perpendicular to the surface of the optical disk by rotation about shaft 334. The ends of shaft 334 are seated in cutout portions 336 and 338 formed in forward arms 340 and 342 of the tracking arm 300. The shaft 334 passes through an aperture 344 formed in the VCM block 326. Bearings 346 and 348 allow the focus arm 302 to pivot relative to the tracking arm 300. Rotational movement of the focus arm 302 about the shaft 334 is caused by alternating the current path in coil 330 which creates a magnet field that interacts with the magnetic field of permanent magnet 328. Depending upon the direction of the current in coil 330, a torque is created relative to the field of the permanent magnet 328, causing the focus arm 302 to move towards or away from the surface of the optical disk.

The forward end of the focus arm 302 includes a pair of support arms 350 and 352, which hold and support the OPU 324 containing objective lens 356. A flex circuit 358 provides control signals to the OPU from appropriate microprocessors (not shown). A heat sink 360 can be included to assist dissipating heat generated by the laser (not shown) within the OPU 324.

FIGS. 36-53 show a sixth embodiment of the actuator arm 410 of the present invention. As generally shown, the actuator arm includes a rear portion 412 and a front portion 414. The front portion 414 is also referred to as a focus arm. A voice coil 416 is positioned between two extensions or legs 418, 420 formed in the rear portion and cooperate with permanent magnets, not shown, to form a voice coil motor (VCM) to position the actuator arm 410 relative to the surface of a disk. A bearing cartridge 422 is disposed within a circular bore formed between legs 424, 426 of the front portion 414 and legs 428, 430 of the rear portion 412. An optical pickup unit 432 for reading information from or writing information to an optical disk is disposed at the distal end of the focus arm 414. A second voice coil motor 434 acts to move the focus arm 414 of the actuator 410 in a direction generally perpendicular to the surface of the disk in order to maintain the optical pickup unit in focus with the information layer contained on the disk. The actuator arm 410 is discussed in greater detail in pending U.S. application Ser. No. 09/557,284, which is incorporated herein by reference. Although the actuator arm is described in the context of an optical disk drive, it should be understood that it applies equally to other applications, including but not limited to magnetic hard disk drives.

The optimal arm geometry is defined by optimization of the stiffness to weight ratio as further constrained by space available within the disk drive. Torsional and bending stiffness are critical to minimization of arm deflections which would otherwise decade the accuracy of the servo-mechanical positioning system. In order to optimize stiffness and minimize mass simultaneously, materials for the construction of the arm are selected to maximize the stiffness to weight ratio. Composite fiber material, made of epoxy resin and fibers in a composite matrix are well suited to optimize the stiffness to weight ratio. Typical fiber materials are selected from the group comprising carbon, magnesium, boron, beryllium, KEVLER composite fiber material, glass and ceramic. Composite fiber materials of this type can be made in sheet form, where the fiber orientation within the sheet is unidirectional. The bending stiffness of such a sheet composite fiber material is greater in one direction than the other. The stiffness is low in the direction parallel to the fibers and is very high in the direction perpendicular to te fibers. In order to optimize stiffness while minimizing mass, material is intentionally left out, creating voids, where the materials contribution to stiffness was not substantial compared to its weight contribution. The effect of the voids is to interrupt fibers that would have been continuous were it not for the void. In an arm comprised of a single unidirectional fiber matrix, interruption of the fiber contributes detrimental effect to the stiffness of the structure. The optimization therefore requires creation of structural planar elements comprising beam portions. The beam portions in the arm are directionally oriented specifically to create high bending and torsional stiffness, incorporating voids for mass reduction, utilizing fiber composite materials wherein multiple layers of the composite are comprised of fibers that are aligned with the principal axes of the various beam portions. This permits the use of long uninterrupted fibers which contribute optimal stiffness to the respective beam portions with reduced or minimal mass.

Figure 38:
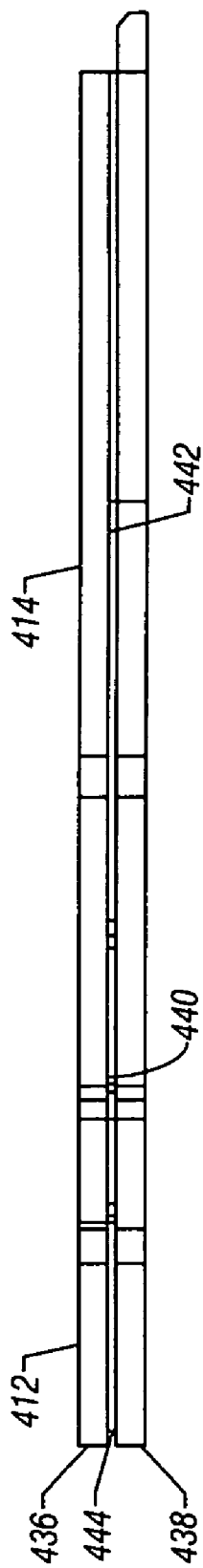
FIG. 38 is a side view of the assembly shown in FIG. 37.
Figure 39:
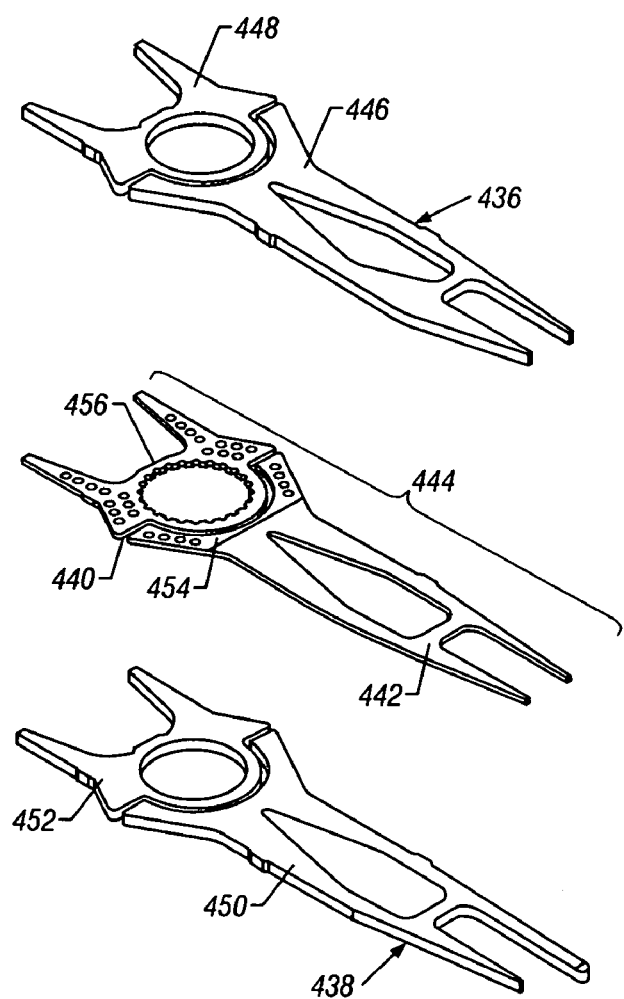
FIG. 39 is an exploded view of the actuator assembly shown in FIG. 37.

FIGS. 37-39 provide additional views of the actuator arm 410, with the optical pickup unit, voice coil motor assemblies and bearing cartridge removed. The forward and rearward portions 412,414 of the actuator arm 410 of the preferred embodiment are each comprised of an upper planar element 436 and a lower planar element 438 with a flexure member 440 and spacer member 442, comprising a third planar element 444, disposed between the upper and lower planar elements. In the preferred embodiment as partially illustrated in FIG. 40, both the upper and lower planar elements 436,438 comprise eight separate layers or plies of carbon fiber material L,-L8 made from composite planar element panels 458, although the number of layers or plies comprising the overall laminate structures which are the planar elements 436, 438 may be more or less, provided symmetry about the neutral axis of the planar element is generally maintained. In particular, each carbon fiber layer $L_1, L_8$ of the planar elements 436,438 has a distinct geometry and purpose such that the resulting carbon fiber planar element can take advantage of the separate benefits of the individual layers. In this regard, the fibers within each layer are oriented to optimize the purpose of the layer and each layer can form a uniaxial fiber matrix. For example, fibers are oriented parallel to the orientation of beam element to provide desired stiffness and the fibers of different layers cross at high enough angles with respect to the other individual layers to provide an overall laminate structure which is stiff in some directions and flexible in others. Generally, the fibers are parallel to each other within each carbon fiber layer $L_1$-$L_8$, but the orientation of the fibers from layer to layer in an overall planar element of the actuator assembly may vary.

Figure 41:
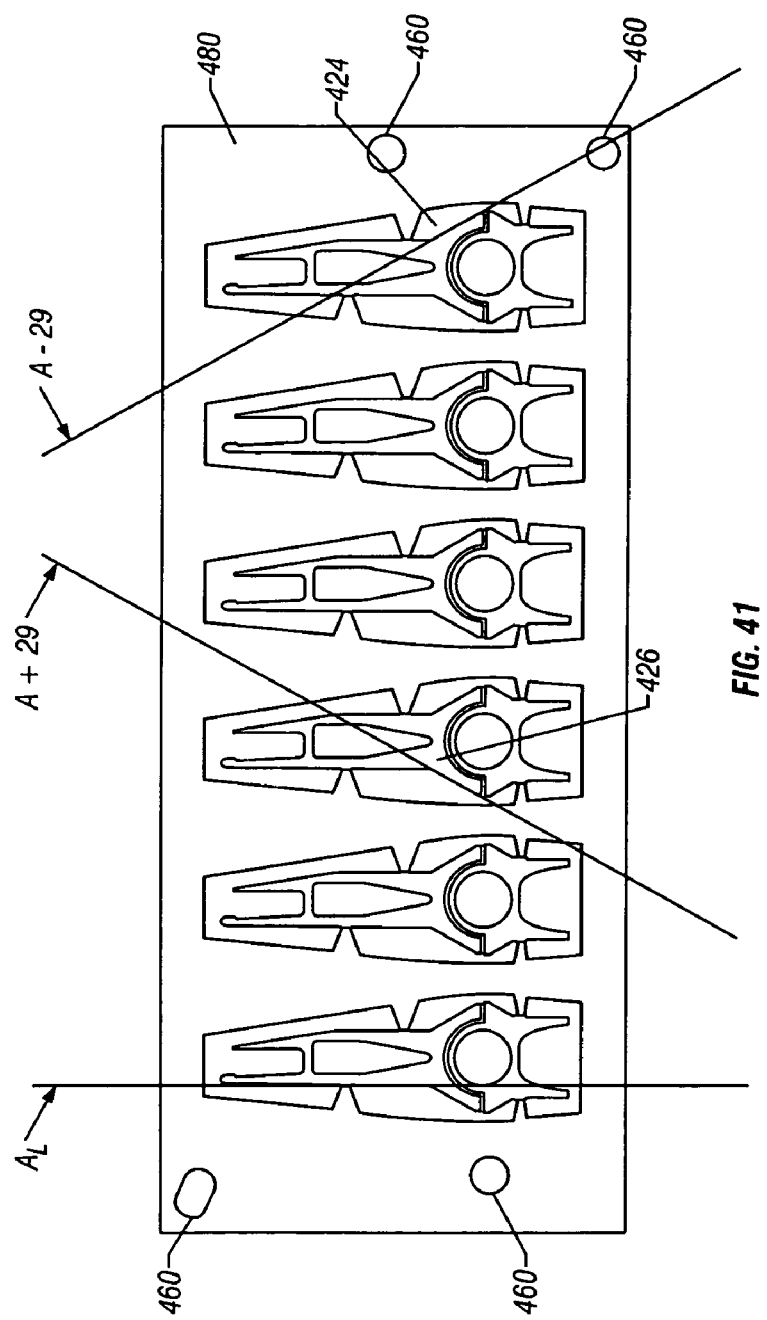
FIG. 41 is a top plan view of an array of lower composite planar elements, further showing the various axes of orientation of the fibers within the layers comprising the upper and lower composite planar elements.
Figure 42:
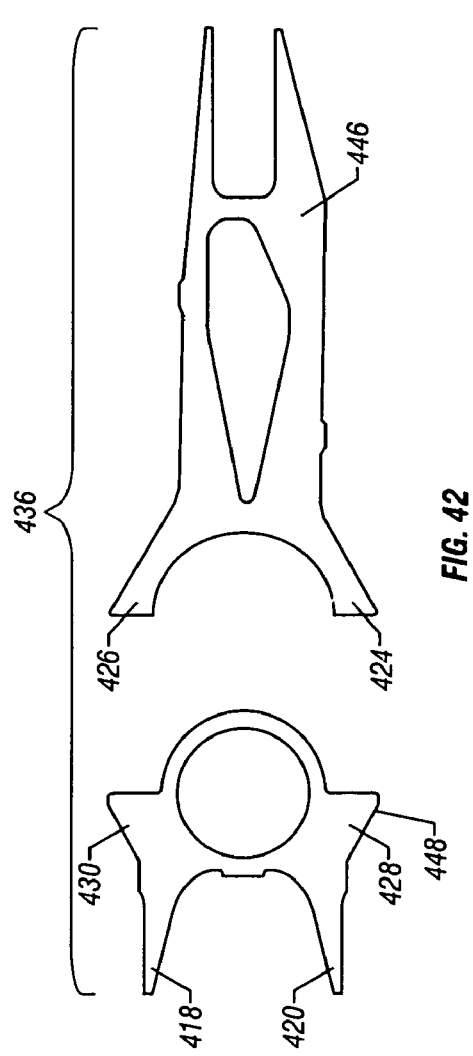
FIG. 42 is a separate top plan view of the forward and rearward portions of the upper composite planar element of the actuator assembly shown in FIG. 37.
Figure 43:
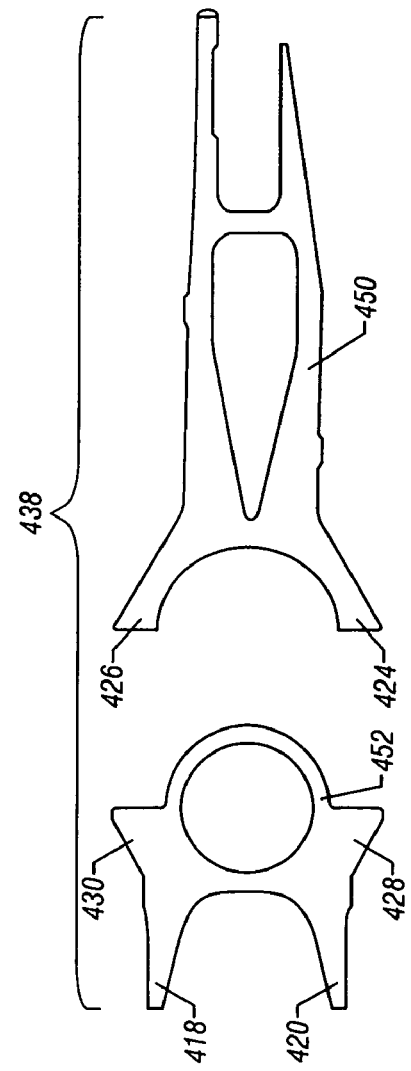
FIG. 43 is a separate top plan view of the forward and rearward portions of the lower composite planar element of the actuator assembly shown in FIG. 37.

In the planar elements having eight carbon fiber layers, the fibers in each layer are approximately 0.002 inches in diameter. In addition, in four of the eight layers $L_1$, $L_2$, $L_7$, $L_8$, the fibers have a zero degree orientation, meaning the fibers are aligned parallel to the longitudinal axis AL of the actuator arm 410 as shown in FIG. 41. Two of these zero degree oriented layers $L_1$, $L_2$, are the upper most layers and two of the zero degree oriented layers $L_7$, $L_8$, are the lower most layers of the planar elements 436, 438. The fibers in the center four layers $L_3$-$L_6$, are oriented alternately at plus or minus 29 degrees relative to the 1o longitudinal axis AL. This orientation is shown in FIG. 41 at A+29 and A−29. Twenty-nine degree fiber orientation is selected because it is the orientation of arm segments 424 and 426 relative to the long axis of the actuator arm. By orienting the fibers of these layers $L_3$-$L_6$ to be parallel to the orientation of arm segments 424, 426, these arm segments or beam elements are stiffened with respect to bending. The layers $L_1$-$L_8$ are arranged symmetrically by their fiber orientation to avoid curling of the composite planar element panels 458 and planar elements 436, 438. The varying fiber orientation of the layers also gives greater strength to the overall structure and helps reduce or eliminate damage to the planar elements 436, 438 during handling and assembly. Also, it is desirable to carefully control the quantity of resin within each fiber layer $L_1$-$L_8$. By matching the thickness of the individual layers $L_8$ as close as possible to the diameter of the fibers, the strength of the laminated layers, and thus the fiber planar element, increases.

Carbon is the preferred fiber because it has among the highest ratios of stiffness to density. For example, the specific gravity of a carbon fiber planar element is approximately 1.8, very near that of magnesium, but will have a Young's modulus of approximately 50 million pounds per square inch, whereas magnesium has a Young's modulus of approximately 7 million pounds per square inch. By way of comparison, steel has a Young's modulus of 30 million pounds per square inch, but a specific gravity of 7.8. Thus, a carbon fiber planar element is approximately four times less dense than steel, but is sixty-seven percent stiffer.

Each planar element 436, 438 is comprised of a forward portion and a rear portion to allow the focus arm 414 of the actuator assembly 410 to pivot relative to the disk surface. Thus, with reference to FIGS. 39 and 42-44, the upper planar element 436 includes a front portion 446 and a rear portion 448 and the lower planar element 438 includes a front portion 450 and a rear portion 452.

Figure 44:
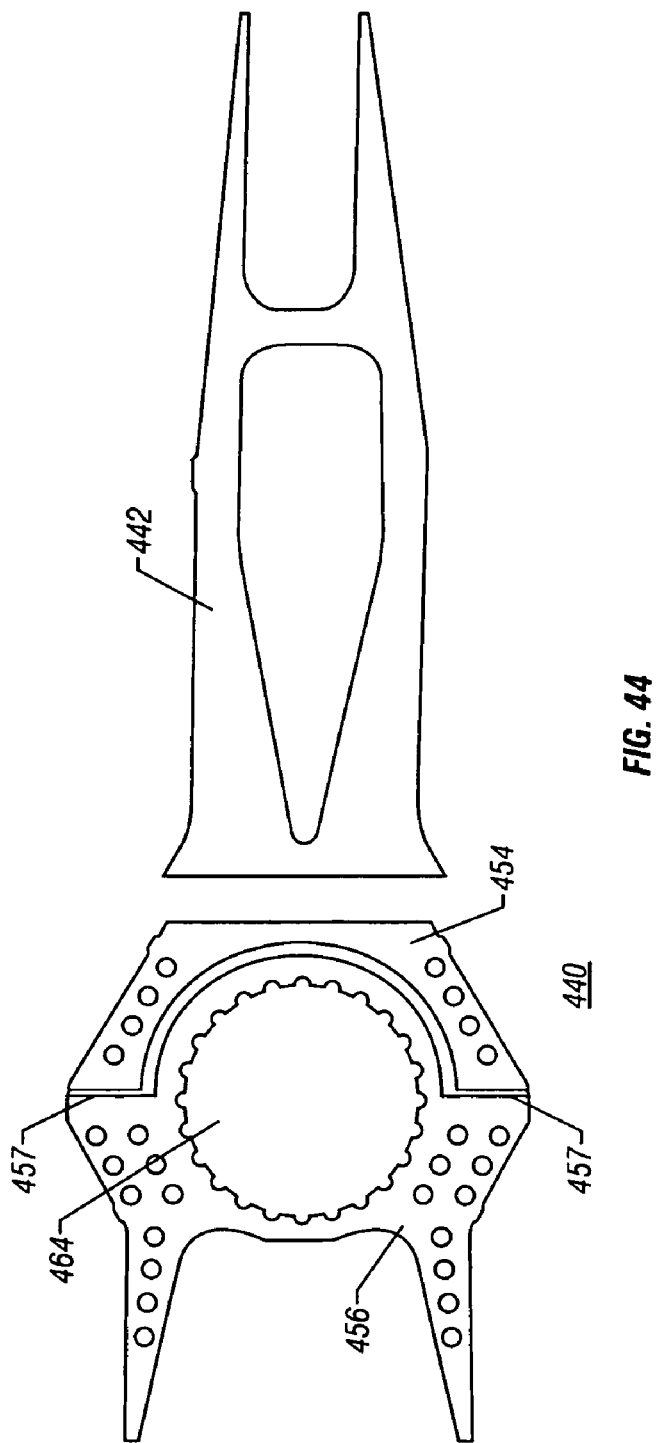
FIG. 44 is a top plan view of the flexure and spacer of the actuator assembly shown in FIG. 37.
Figure 47:
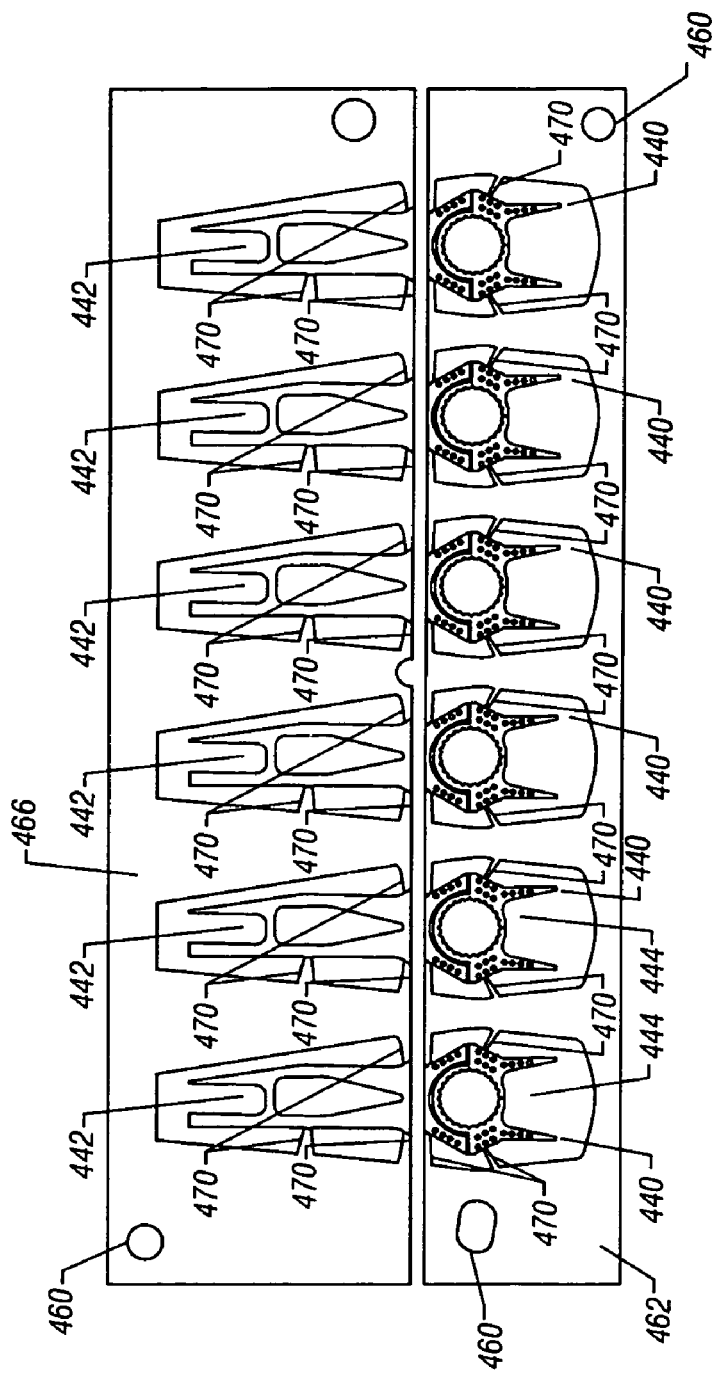
FIG. 47 is a top plan view of an array of flexure and spacer members of the actuator assembly shown in FIG. 37.

FIG. 44 illustrates an individual flexure member 440 and spacer 442 and FIG. 47 illustrates an array of flexure members 440 and spacers 442 in panel forms 462 and 466 respectively. Preferably, the material used to make the flexures 440 is a flexible metal such as Sandvick 11R51, which is a 301 series stainless steel having a yield strength of approximately 283,000 psi. However, it should be appreciated that the flexures 440 can be made from any appropriate flexible material that can withstand repeated bending as the focus arm 414 is adjusted to maintain focus on the data layer within the disk. Alternatively, the spacer 442 may be made from fiber composite material like the upper and lower planar elements 436,438. In addition, the foot print of the spacer 442 may closely match that of the forward portions 446, 450 of the upper and lower planar elements 436, 438, respectively, or it may be smaller and have a profile different from the forward portions of the planar elements to reduce weight or provide different stiffness characteristics to the actuator assembly.

The flexure members 440, as shown in FIG. 44, include a front portion 454 and a rear portion 456 which generally match the contour of the adjacent areas of the front and rear portions of the upper and lower planar elements 436, 438. The rear portion 456 of the flexure includes an aperture 464 to receive a bearing cartridge 422. Importantly, a pair of narrow bridges 457 connect the front portion 454 and the rear portion 456 and allow the front portion 454 to pivot relative to the rear portion 456. The narrow portion or bridge 457 avoids any glue seepage from the adjacently abutting upper and lower planar elements 436, 438 from altering the frequency of the flexure. As a result, the desired response of the bending of the actuator arm is controlled. Absent this narrow bridge 457 being present, glue seepage into the area could alter the bending characteristics of flexure 440. Altering the shape of the flexure is more easily accomplished than controlling glue seepage. The array of flexure members in panel 462, as shown in FIG. 47, is preferably made by a die cutting and coining process, but could be made by etching or any other process known to persons of skill in the art.

Figure 40:
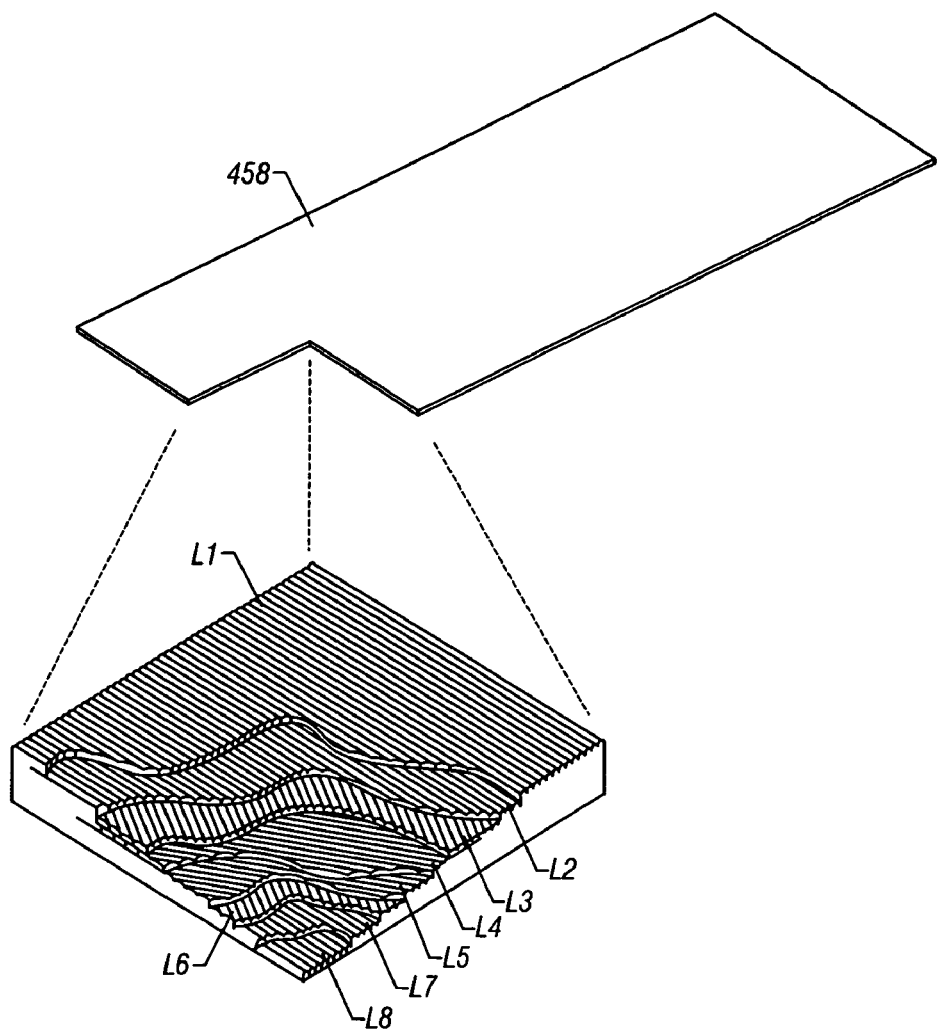
FIG. 40 is a partial cut away perspective view of the layers of an upper and lower composite planar element and a composite planar element panel of the present invention, showing the orientation of the fibers in each layer.
Figure 45:
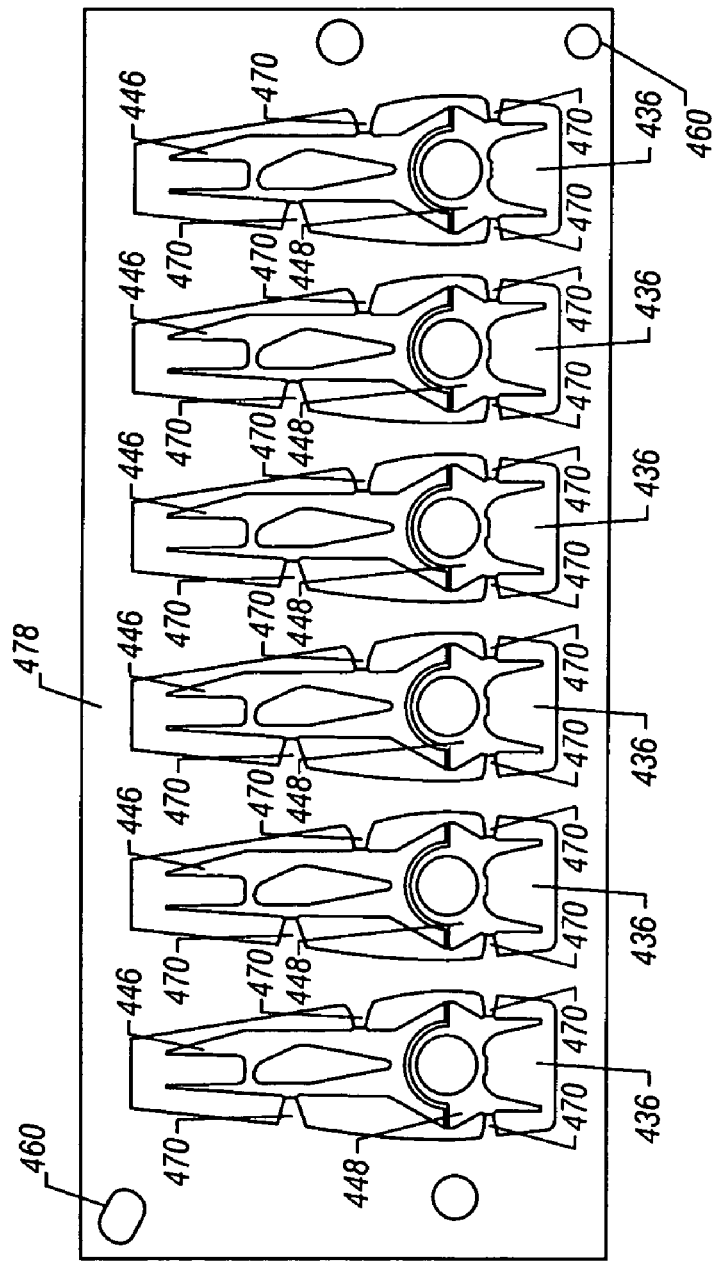
FIG. 45 is a top plan view of an array of upper composite planar elements of the actuator assembly shown in FIG. 37.
Figure 46:
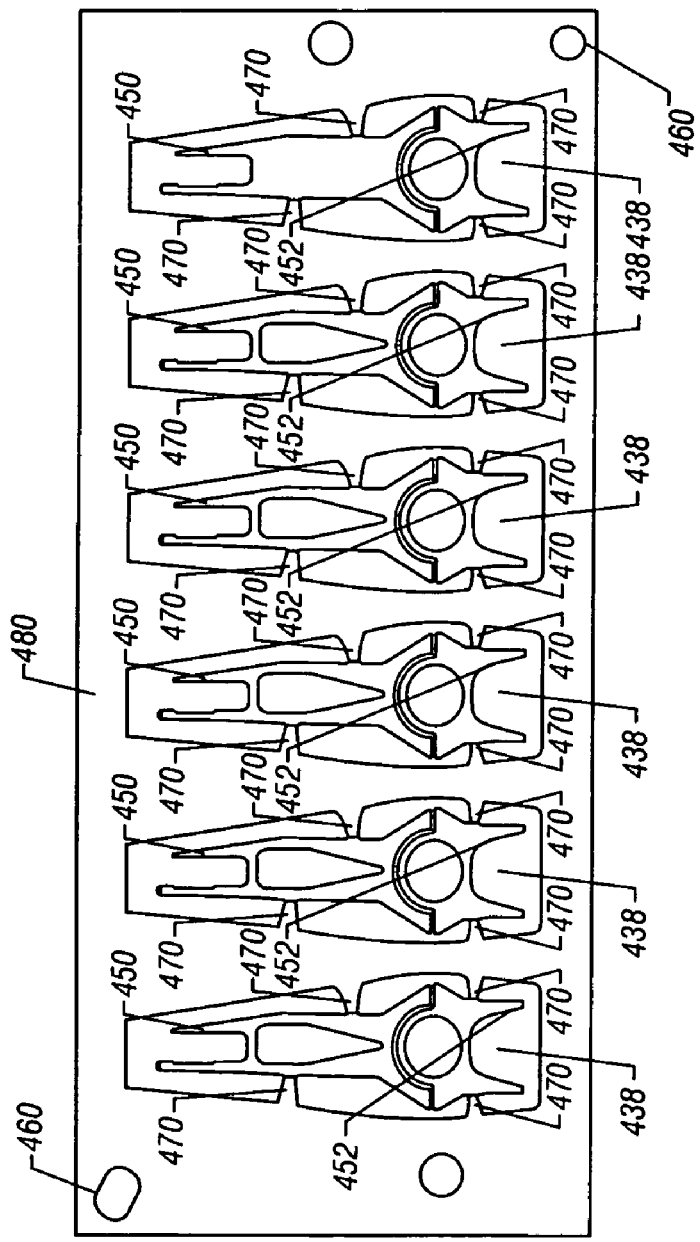
FIG. 46 is a top plan view of an array of lower composite planar elements of the actuator assembly shown in FIG. 37.

For purposes of manufacture, eight layers or plies of carbon fiber material $L_1$-$L_8$, with the fibers preferably substantially oriented at a predetermined angle (see FIGS. 40, 41), are joined together to form a single carbon fiber laminate or panel 458, as shown in FIG. 40. Arrays of upper and lower planar elements 436, 438 are cut into the laminated panel 458 to form cut panels 478 and 480 (see FIGS. 45, 46). The number of individual component pieces to be cut in an array may vary. The embodiment shown in the drawings have six upper or lower planar elements 436, 438 per array. Ideally, a computer or numerically controlled water jet is used to cut the component footprints in each panel 458. Alternatively, similarly controlled milling machines can cut the array of component pieces from the panel 458. A waterjet, however, is not only faster, but is much more cost effective than milling machines, Where a milling machine utilizes a cutting tool that wears out and needs regular replacement, a waterjet has no such problem. Moreover, a waterjet can cut multiple panels 458, creating multiple copies of cut panels 478 and 480 at one time, thereby further increasing output. FIGS. 45 and 46 illustrate arrays of six upper and lower planar elements 436, 438 cut into two panels 458 of eight laminated carbon fiber layers, respectively. At the same time as the water jet, or other methods known and available to those skilled in the art cut the arrays of upper and lower planar elements 436, 438 registration members, such as holes 460, are also cut in the panels 458. The purpose for cutting the registration holes 460 at the same time as the component structural pieces are cut is to reduce subsequent errors in alignment when assembling and bonding the multiple planar elements into an actuator arm. In this manner, the only error is that which would result due to the CNC cutting process, but not to the alignment of the planar elements when combined. Alternatively, the individual layers $L_1$-$L_8$ may be separately cut to form arrays of component pieces and then laminated to form panels 478, 480 of planar elements 436, 438 or uncommon cuts in each layer $L_1$-$L_8$ can be made individually and all common cuts can be made following lamination of the multiple layers into a single planar element. The process of forming registration features in each layer would be the same in order to enhance accurate alignment of the individual layers $L_1$-$L_8$.

In general terms, a method of assembling the actuator of the present invention will now be described. As illustrated in FIGS. 40 and 41, depicting a first embodiment, eight carbon fiber layers $L_1$-$L_8$ are combined to form the upper and lower panels 458, which are then cut to create cut panels 478, 480, from which fiber planar elements 436, 438 will result. Each layer $L_1$-$L_8$ is impregnated with epoxy for bonding the individual layers together. The combined structure is placed in an autoclave under appropriate pressures and temperatures to activate the epoxy and secure the layers $L_1$-$L_8$ into a laminate panel 458. In connection with the preferred embodiment, the temperature is approximately 325° F. and the applied pressure is approximately 50 pounds per square inch.

Following the autoclave procedure, the laminated panels 458, are cut, by means of waterjet or other appropriate techniques, into an array of upper and lower carbon fiber planar elements 436, 438 of the actuator arm 410 in panels 478 and 480. Alternatively, the cutting of component pieces within the individual layers $L_1$-$L_8$ may be done prior to bonding the layers together or some of the cut may be made in individual layers and the remaining cuts are made in the overall laminated panel. At this point, registration features 460 are also accurately located and cut into the panels 478, 480. Similarly, an array of flexures 440 are cut from metallic or other appropriately flexible material into a panel 462 which will mate with a pair of upper and lower fiber planar panels 478, 480. Also, an array of spacers 442 are cut from appropriate material into a panel 466, which will also mate with the pair of upper and lower fiber planar panels 478, 480. The flexure and spacer panels 462, 466 also have aligned registration features, such as apertures 460, to match those in the carbon composite planar panels 478, 480. In the cutting process, a number of sprues 470 are left between the planar elements 436, 438 and the surrounding panels 478, 480, as well as between the flexures 440 and spacers 442 and the remaining panels 462 and 466 respectively. The registration holes 460 maintain alignment among the panels 462, 466, 478 and 480 during further processing. It should be appreciated that other methods of providing registration among the various panels can be used instead. For example, alignment may be achieved by using panel edges or corners, or by optically detecting identified fiduciaries on the panel or by bearing bores.

Figure 48:
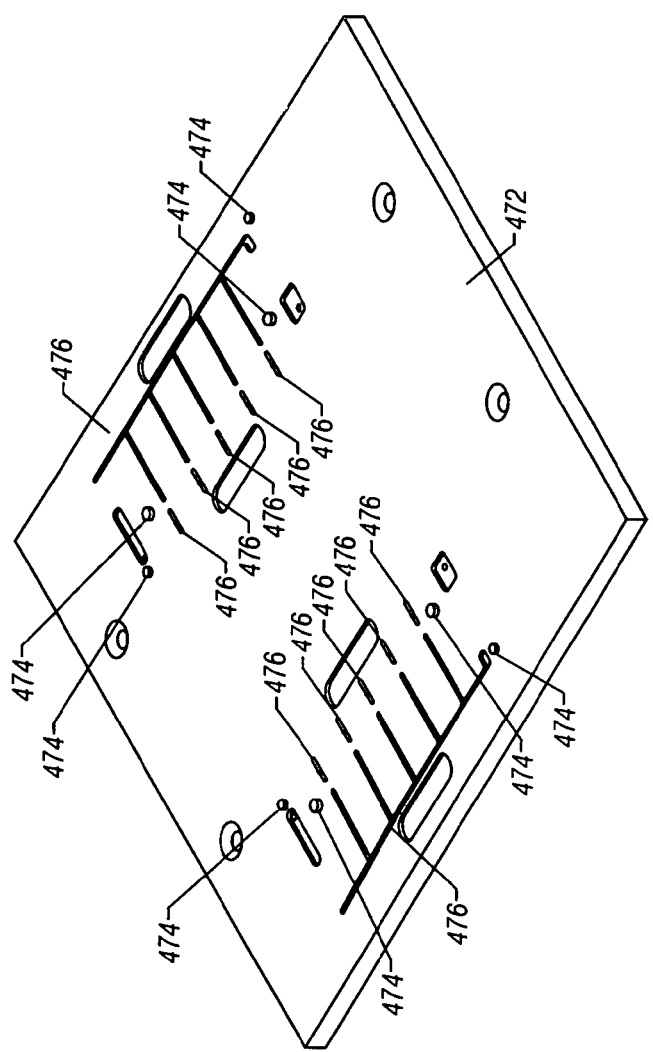
FIG. 48 is an elevated perspective view of a vacuum chuck assembly used in assembling an actuator assembly of the present invention.
Figure 49:
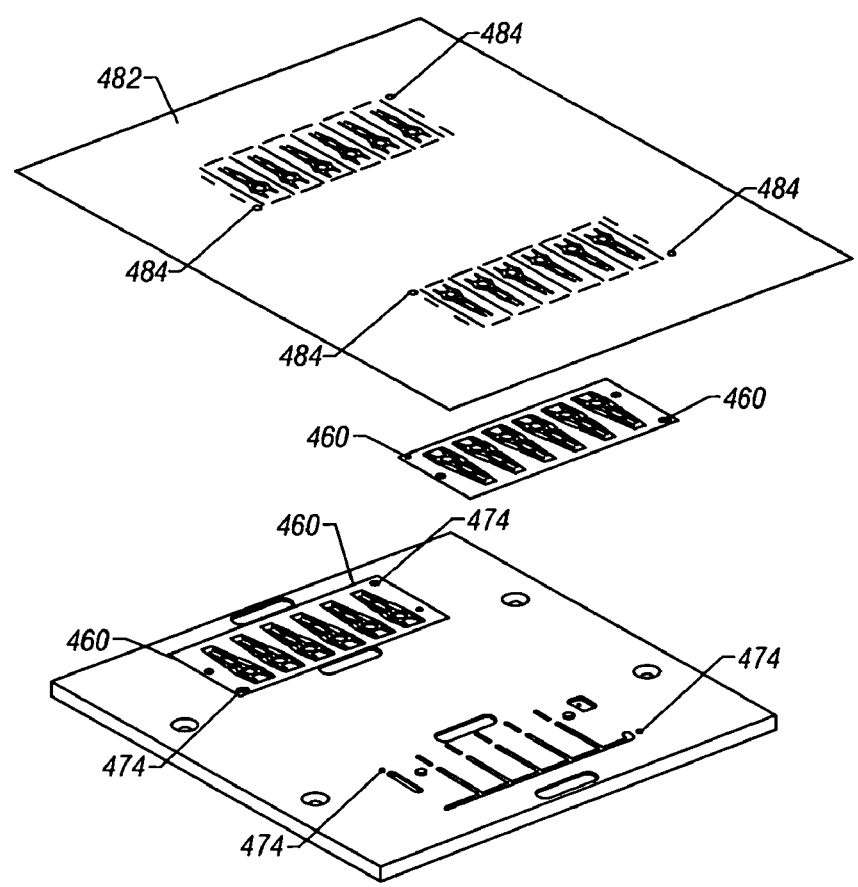
FIG. 49 is a partially exploded view of a vacuum chuck assembly, an array of upper composite planar elements and a silk screen adhesive pattern used in assembling an actuator assembly of the present invention.

At this point, the panels 462, 466, 478 and 480 are ready to be combined into an actuator arm assembly. The upper and lower carbon fiberpanels 478, 480 containing planar elements 436, 438, are placed on a clamping fixture, such as vacuum chuck 472 (FIG. 48). The registration pins 474 on the chuck 472 mate with the registration holes 460 in the panels 478, 480 and properly co-align the panels. Vacuum pressure through slots 476 hold an upper and lower planar element panels 478, 480 in position for application of adhesive. Silk screen techniques are then used to apply adhesive to both the upper and lower fiber planar element panels 478, 480. FIG. 49 illustrates a chuck 472 with a lower panel 480 of planar elements 438 positioned on registration pins 474 and an upper panel 478 of planar elements 436, also intended to be positioned on chuck 472 but elevated from the surface of the chuck 474 for illustration. A silkscreen 482, showing the openings for the pattern of adhesive to be applied, is also shown. The silkscreen also includes registration holes 484 for aligning the silkscreen 482 relative to the panels 478, 480. It should be appreciated however, that other techniques may be utilized to apply adhesive, including but not limited to application by roller, spray, other printing or as a film.

Figure 50:
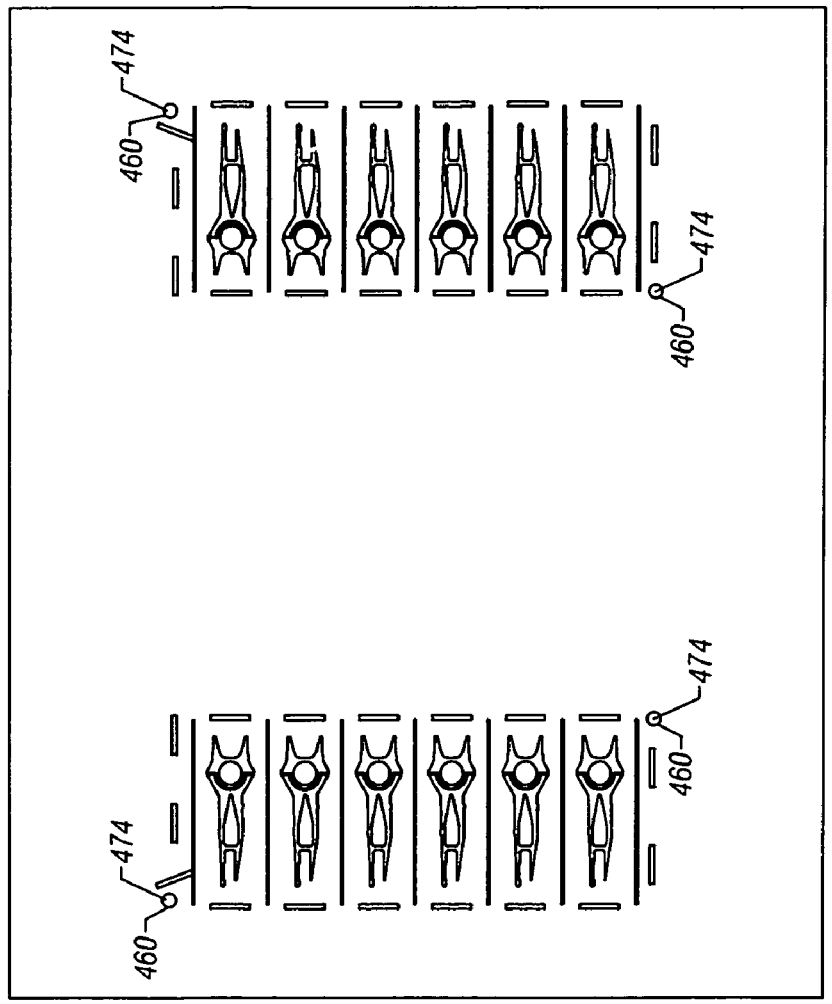
FIG. 50 is a top plan view of the glue pattern for a complementary pair of upper and lower composite planar elements.

To simplify the glue application process, in the preferred embodiment, a single thickness of glue or adhesive is applied across the entire length of the upper and lower panels 478, 480 in one application. Care must be taken to accurately place the adhesive away from edges of the upper and lower planar elements 436, 438 to avoid adhesive being squeezed out along any edges. Yet, it is also necessary to have sufficient adhesive to fill all voids between the upper and lower fiber planar elements, taking into account the existence of the flexure and spacer. The glue pattern applied to upper and lower planar panels 478, 480 is created to by silkscreen 482, as shown in FIGS. 49 and 50. The preferred adhesive is a 3M 2214 metalfilled, single-part epoxy. Because this epoxy cures at approximately 120° C. or higher, the glue can be applied to the upper and lower planar panels 478, 480 using the silkscreen 482 pattern and stored in a cool location without concern that the glue will cure. This allows an inventory of arrays of combined planar elements 436 and 438, with adhesive already applied, to be made in advance and be available for final assembly as demand requires. Alternatively, if the flexure 440 and spacer 442 do not match the shape of the planar elements 436, 438, a different thickness of glue may be applied at locations where the flexure and spacer are absent. In this regard, the glue may be applied in stripes, analogous to half-tone printing processes, rather than in a solid, continuous pattern.

Figure 51:
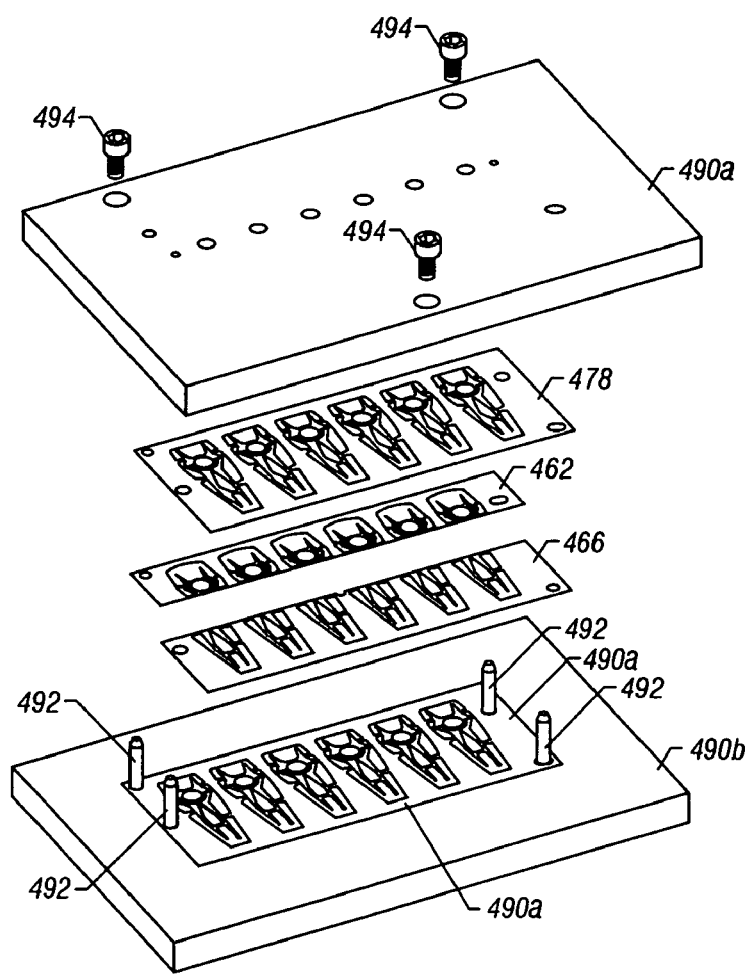
FIG. 51 is an exploded view of the lower bonding plate, composite planar elements, flexure panel, spacer panel and upper bonding plate, showing the depth stops.
Figure 52:
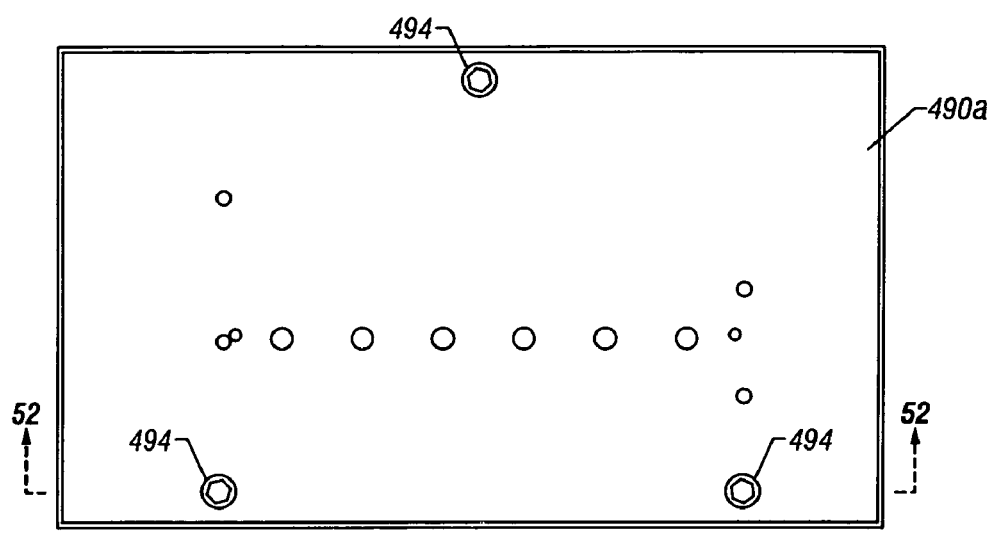
FIG. 52 is a top view of the bonding fixture.
Figure 53:
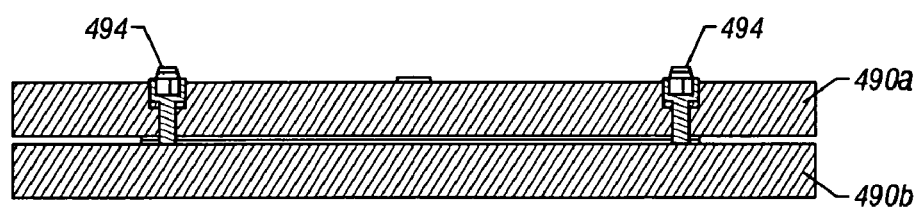
FIG. 53 is a cross-section view of the bonding fixture taken along line 53-53 of FIG. 52.

As completed actuators 410 are needed, the planar panels 478, 480, with adhesive applied as shown in FIGS. 49 and 50, flexure panels 462 and spacer panels 466 can be positioned within bonding plates 490a and 490b as shown in FIG. 51 using the registration holes 460 and registration pins 492. The upper bonding plate 490a is then placed over the combination and secured to the lower bonding plate 490b under appropriate pressure and temperature conditions. As shown in FIGS. 52 and 53, the bonding plates include adjustable limit stops 494, which establish the spacing between the upper and lower plates, thereby establishing the thickness of the actuator assembly. The bonding plates 490 containing the panels 478, 480, 466 and 462 are placed in an oven for bonding the component pieces into a final laminated structure. Presently, using the 3M epoxy, this process takes approximately two hours in an oven at 150° C. It should be understood that the process parameters can vary, particularly depending upon the epoxy used.

Once cured, the completed lamination can be removed from the bonding plates, while the individual component pieces remain attached to the surrounding structure due to the sprues 470. This allows for ease of handling without damage to the miniature laminated structures. It further allows the other component pieces, such as the optical pickup unit, flex circuit, voice coil motors and bearing cartridge, to be assembled to the actuator structure with simplicity.

With respect to the sixth embodiment, it will be apparent that other modifications, alterations and variations may be made by or will occur to those skilled in the art to which this invention pertains, particularly upon consideration of the foregoing teachings. For example, the number of layers or plies within the fiber planar elements may vary as may the relative orientation of the fibers within each layer. In addition, while carbon fiber composite material performs well in this application, other materials such as glass, magnesium, boron, beryllium, KEVLAR composite fiber material and ceramics, alone or in various combinations may also perform satisfactorily. It is also contemplated that the component shapes may be cut from individual layers of material, which layers are subsequently laminated to form a composite panel, or that the component shapes are cut from the composite panel. It is still further contemplated that the individual layers comprising a planar element may have varying shapes and sized relative to each other. The objective is to achieve a lightweight, but a strong and stiff actuator assembly.

While a few principal embodiments and certain alternative embodiments have been shown and described, it will be apparent that other modifications, alterations and variations may be made by and will occur to those skilled in the art to which this invention pertains, particularly upon consideration of the foregoing teachings. For example, the pivoting or rotation of the tracking arm and the focus arm may be provided by a ball bearing pivot, jewel bearing pivot, knife edge pivot, flexure pivot, bushing pivot, split band pivot or any type of torsional pivot such as a torsional shear member pivot or other type of structure known to persons of skill in the art for achieving the desired relative movement. In addition, it would be understood that the location of any pivot point of the focus arm could be changed, as could the location and arrangement of the voice coil motor components. For example, either the magnets or the coil could be stationary and the other move relative to the stationary components. Additionally, the respective VCM magnets and coils, on both the tracking arm and focus arm, can be alternatively positioned on the same side of the rotational axis as the optical pick up unit or on the opposite side of the rotational axis as the optical pick up unit for the respective arm. In doing so, however, it should be understood that this relative close proximity of multiple voice coil motors may lead to cross coupling between the VCMs which can affect the performance of the tracking arm and focus arm. In the present invention, this problem has been addressed by optimizing the various return path structures as shown in the illustrated embodiments. In particular, for the specific embodiments disclosed herein, the return paths have been selected, in part, to assist in directing the magnetic fields to the appropriate VCM and away from the other VCM. It is therefore contemplated that the present invention is not limited to the embodiments shown and described and that any such modifications and other embodiments as incorporate those features which constitute the essential features of the invention are considered equivalents and within the true spirit and scope of the present invention.

What is claimed is:

1. An optical disk drive comprising:
a housing including a base portion; and
an actuator assembly having a first end, the actuator assembly being pivotally mounted to the base portion to movably position the first end parallel to a surface of an optical disk, the actuator assembly including a portion pivotally mounted to the remainder of the actuator assembly and configured to position said first end along an arcuate path that is substantially perpendicular to the surface of the disk; and
an optical pick up unit including a laser source connected to the portion, said optical pick up unit including an objective lens adapted to focus a light beam from the laser source on said optical disk.

* * * * *